US010763509B2

(12) United States Patent
Kuzuoka et al.

(10) Patent No.: US 10,763,509 B2
(45) Date of Patent: Sep. 1, 2020

(54) POSITIVE ELECTRODE FOR LITHIUM ION SECONDARY BATTERY, ELECTRODE FOR LITHIUM ION SECONDARY BATTERY, ELECTRODE ACTIVE MATERIAL LAYER INCLUDING POLYOLEFIN PARTICLES, AND LITHIUM ION SECONDARY BATTERY

(71) Applicant: HITACHI CHEMICAL COMPANY, LTD., Tokyo (JP)

(72) Inventors: Hiroki Kuzuoka, Tokyo (JP); Eisuke Haba, Tokyo (JP); Shunsuke Nagai, Tokyo (JP); Kenji Takaoka, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 84 days.

(21) Appl. No.: 15/549,579

(22) PCT Filed: Feb. 2, 2016

(86) PCT No.: PCT/JP2016/053094
§ 371 (c)(1),
(2) Date: Aug. 8, 2017

(87) PCT Pub. No.: WO2016/129459
PCT Pub. Date: Aug. 18, 2016

(65) Prior Publication Data
US 2018/0040899 A1 Feb. 8, 2018

(30) Foreign Application Priority Data

Feb. 10, 2015 (JP) ................................. 2015-024611
Feb. 12, 2015 (JP) ................................. 2015-024878

(51) Int. Cl.
*H01M 4/13* (2010.01)
*H01M 4/62* (2006.01)
(Continued)

(52) U.S. Cl.
CPC ............. *H01M 4/628* (2013.01); *H01M 4/13* (2013.01); *H01M 4/62* (2013.01); *H01M 4/624* (2013.01);
(Continued)

(58) Field of Classification Search
CPC .......... H01M 4/628; H01M 4/13; H01M 4/62; H01M 4/624; H01M 10/052; H01M 10/0525; H01M 10/4235; H01M 2004/028
See application file for complete search history.

(56) References Cited

U.S. PATENT DOCUMENTS

2011/0027657 A1   2/2011   Nishinaka et al.

FOREIGN PATENT DOCUMENTS

JP      H10241665 A      9/1998
JP      2004-247292 A    9/2004
(Continued)

OTHER PUBLICATIONS

International Search Report for PCT/JP2016/053094 dated Apr. 5, 2016; English translation submitted herewith (5 pages).
English language machine translation of JP 2013-105681.

Primary Examiner — Raymond Alejandro
(74) Attorney, Agent, or Firm — Fitch, Even Tabin & Flannery, L.L.P.

(57) ABSTRACT

Provided are a positive electrode for a lithium ion secondary battery, the positive electrode including a positive electrode active material layer, the positive electrode active material layer including insulating polyolefin particles and an electroconductive material; an electrode for a lithium ion secondary battery, the electrode including an electrode active material layer, the electrode active material layer including polyolefin particles and a resin including a structural unit derived from a nitrile group-containing monomer; and a lithium ion secondary battery using the same.

10 Claims, 4 Drawing Sheets

(51) Int. Cl.
  *H01M 10/42* (2006.01)
  *H01M 10/0525* (2010.01)
  *H01M 4/02* (2006.01)

(52) U.S. Cl.
  CPC ... *H01M 10/0525* (2013.01); *H01M 10/4235* (2013.01); *H01M 2004/028* (2013.01); *Y02T 10/7011* (2013.01)

(56) References Cited

FOREIGN PATENT DOCUMENTS

| | | | | |
|---|---|---|---|---|
| JP | 2009-176599 A | 8/2009 | | |
| JP | 2010-092719 A | 4/2010 | | |
| JP | 2011-029079 A | 2/2011 | | |
| JP | 2013-105681 | * 5/2013 | .......... | H01M 10/052 |
| JP | 2013-105681 A | 5/2013 | | |
| WO | 2006/132474 A1 | 12/2006 | | |

* cited by examiner

POSITIVE ELECTRODE FOR LITHIUM ION SECONDARY BATTERY, ELECTRODE FOR LITHIUM ION SECONDARY BATTERY, ELECTRODE ACTIVE MATERIAL LAYER INCLUDING POLYOLEFIN PARTICLES, AND LITHIUM ION SECONDARY BATTERY

CROSS-REFERENCE TO RELATED APPLICATIONS

This application is a U.S. national phase application filed under 35 U.S.C. § 371 of International Application No. PCT/JP2016/053094, filed Feb. 2, 2016, designating the United States, which claims benefit of the filing dates of JP 2015-024611, filed Feb. 10, 2015, and JP 2015-024878, filed Feb. 12, 2015, each of which is hereby incorporated herein by reference in its entirety.

TECHNICAL FIELD

The present invention relates to a positive electrode for a lithium ion secondary battery, an electrode for a lithium ion secondary battery, and a lithium ion secondary battery.

BACKGROUND ART

Lithium ion secondary batteries are broadly used as energy devices with a high energy density as power sources for portable information terminals such as notebook computers, cell phones, and PDAs (Personal Digital Assistant). For typical lithium ion secondary batteries, a group of wound electrodes obtained by layering a positive electrode, an insulation layer, a negative electrode, and an insulation layer in this order and coiling the same, or a group of laminated electrodes obtained by layering a positive electrode, an insulation layer, and a negative electrode, has been used. As an active material for a negative electrode, a carbon material having a multilayer structure capable of intercalating a lithium ion between layers (i.e., forming a lithium intercalation compound) and releasing the same is mainly used. As an active material for a positive electrode, a lithium-containing metal complex oxide is mainly used. As an insulation layer, a polyolefin porous film is mainly used. Such lithium ion secondary batteries have high battery capacities and output powers as well as superior charge and discharge cycle performances.

Although lithium ion secondary batteries are at a high level in terms of safety, further improvement of safety has been demanded in view of their high capacities and high power. For example, when lithium ion secondary batteries are overcharged, there is possibility of heat generation. Further, heat may also be generated by occurrence of an internal short-circuit. Moreover, since lithium ion secondary batteries contain a nonaqueous electrolyte containing an organic solvent, there is the possibility that the generated heat will cause chemical degradation of the organic solvent to generate a gas, leading to a trouble such as an increase in an internal pressure of a battery or the like.

Currently, further improvement of the safety of lithium ion secondary batteries is intended by cutting off a current inside the batteries to suppress heat generation, when the lithium ion secondary batteries are overcharged or the like. Examples of means for improving safety include: (1) a method of utilizing a mechanism, such as a safety valve provided in a sealing plate, which detects an internal pressure of a battery and cuts off the current; (2) a method in which a sealing plate is provided with a component composed of a PTC (Positive temperature coefficient) element whose electrical resistance increases in response to the heat generation in the battery, and the current is cut off when the PTC element becomes a nonconductor; and (3) a method in which an insulation layer that is melted in response to heat generation in the battery is used, and when the insulation layer melts, movement of a lithium ion between a positive electrode and a negative electrode is inhibited so that the current is cut off.

Meanwhile, as another method for cutting off a current to suppress heat generation, an electrode provided with a PTC layer has been proposed (for example, refer to Japanese Patent Application Laid-Open (JP-A) No. 2009-176599). A PTC layer indicates, similar to a PTC element, a layer having a function to increase the electrical resistance (direct current resistance) in response to heat generation of a battery. The electrode (at least one of a positive electrode or a negative electrode) according to JP-A No. 2009-176599 is a layered body in which a positive electrode active material layer or a negative electrode active material layer, a PTC layer, and a current collector are layered in this order.

Further, a method in which a PTC conductive material whose electrical resistance (direct current resistance) increases in response to heat generation in the battery is used in an electrode active material has been proposed in JP-A No. H10-241665.

SUMMARY OF INVENTION

Technical Problem

However, regarding the method (1), progress of a degradation reaction of an electrolyte solution, which causes a change in an internal pressure of a battery, is strongly affected not only by a battery temperature but also by a battery voltage, an environment temperature, and the like. As a result, a response to heat generation becomes imprecise, and the inhibitory effect against heat generation may become insufficient. Regarding the method (2), an electrode group, which is a main heat generator, and a PTC element in a sealing plate are located with a certain distance from each other. As a result, the responsiveness of the PTC element with respect to heat generation may be lowered and the inhibitory effect against heat generation may become insufficient. Regarding the method (3), it is necessary to use an insulation layer that is melted in response well to heat generation in a battery. However, when such an insulation layer is used, for instance, a higher power or improved charge and discharge cycle performance of a battery may not be attained satisfactorily.

The PTC layer of JP-A No. 2009-176599 contains resin particles and an electroconductive material. The resin particles are melted by overheating, which brings the electroconductive materials into a non-contact state to cut off a current. However, the PTC layer is formed between the current collector and the electrode active material layer in the positive electrode including the PTC layer of JP-A No. 2009-176599, which causes a problem that the manufacturing process becomes complicated.

The PTC conductive material described in JP-A No. H10-241665 is made of fine particles obtained by pulverizing pellets, in which carbon black and polyethylene are mixed, by a jet mill method. JP-A No. H10-241665 discloses that the electrode active material layer contains the fine particles, to exhibit a PTC function. However, in the PTC conductive material described in JP-A No. H10-241665, the electroconductive material is incorporated in the polyethylene in advance, which causes low conductivity of the PTC conductive material to cause deterioration in the battery characteristics. The inventors have studied to reveal the following problem. In a case in which the proportion of carbon black contained in the PTC conductive material is increased in order to improve the electroconductivity of the PTC conductive material, the deterioration in the battery characteristics can be suppressed, but the PTC function cannot be achieved.

The present invention has been made in view of the above problems, and it is an object of the invention to provide a positive electrode for a lithium ion secondary battery, which has a function of increasing the internal resistance (hereinafter also referred to as "direct current (DC) resistance") of a battery in a case in which the temperature is raised, has excellent battery characteristics during normal operation, and provides a simple manufacturing process, an electrode for a lithium ion secondary battery, and a lithium ion secondary battery using the same.

Solution to Problem

Specific means for solving the above-mentioned problems include the following embodiments.

<1> A positive electrode for a lithium ion secondary battery, the positive electrode including a positive electrode active material layer, the positive electrode active material layer including insulating polyolefin particles and an electroconductive material.

<2> The positive electrode for a lithium ion secondary battery according to <1>, wherein a content of the insulating polyolefin particles is from 0.1% by mass to 10% by mass with respect to a total amount of the positive electrode active material layer.

<3> The positive electrode for a lithium ion secondary battery according to <1> or <2>, wherein a mass ratio of the insulating polyolefin particles to the electroconductive material (insulating polyolefin particles/electroconductive material) in the positive electrode active material layer is from 0.15/0.85 to 0.85/0.15.

<4> The positive electrode for a lithium ion secondary battery according to any one of <1> to <3>, wherein the insulating polyolefin particles have an average particle diameter of from 0.1 μm to 30 μm.

<5> An electrode for a lithium ion secondary battery, the electrode including an electrode active material layer, the electrode active material layer including polyolefin particles and a resin containing a structural unit derived from a nitrile group-containing monomer.

<6> The electrode for a lithium ion secondary battery according to <5>, wherein the polyolefin particles have an average particle diameter of from 0.1 μm to 30 μm.

<7> The electrode for a lithium ion secondary battery according to <5> or <6>, wherein a content of the polyolefin particles is from 0.1% by mass to 10% by mass with respect to a total amount of the electrode active material layer.

<8> A lithium ion secondary battery including at least one electrode selected from the group consisting of the positive electrode for a lithium ion secondary battery according to any one of <1> to <4> and the electrode for a lithium ion secondary battery according to any one of <5> to <7>.

Advantageous Effects of Invention

The invention can provide a positive electrode for a lithium ion secondary battery, which has a function of increasing the internal resistance of a battery in a case in which the temperature is raised, has excellent battery characteristics during normal operation, and provides a simple manufacturing process, an electrode for a lithium ion secondary battery, and a lithium ion secondary battery using the same.

Figure 1:
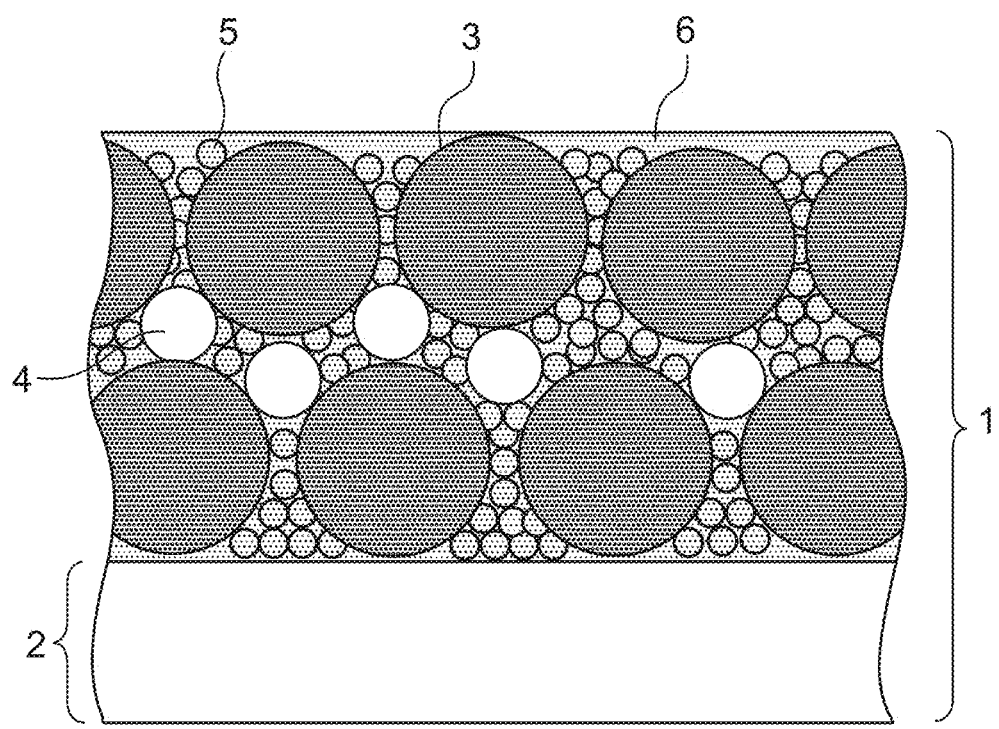
FIG. 1 is a schematic cross-sectional view of a positive electrode for a lithium ion secondary battery according to an embodiment of the invention.

Hereinbelow, preferable embodiments of the invention are described. The matter necessary for carrying out the invention, other than that specifically referred to herein, may be construed as a design matter to be supported by the conventional techniques in the pertinent art, for a person skilled in the art. The invention can be carried out on the basis of the contents disclosed herein and the common technical knowledge in the pertinent art. Dimensional relationships (length, width, thickness, or the like) in the drawings do not necessarily reflect the actual dimensional relationships.

Here, a numerical range expressed by "x to y" includes the values of x and y in the range as the minimum and maximum values, respectively.

Regarding numerical ranges described in a stepwise manner, an upper value or a lower value of one numerical range described in a stepwise manner may be replaced with an upper value or a lower value of another numerical range described in a stepwise manner. Regarding a numerical range described herein, an upper value or a lower value of the numerical range may be replaced with a value shown in a working example.

Regarding the amount of a component of a composition, when plural substances corresponding to the same component exist in the composition, the amount of the component in the composition refers to a total amount of the plural substances in the composition unless otherwise specified.

Regarding a particle size of a component of a composition, when plural particles corresponding to the same component exist in the composition, the particle size of the component in the composition refers to a value obtained from the mixture of the plural particles exist in the composition unless otherwise specified.

The term "layer" as used herein includes not only a structure configured to cover an entire surface but also a structure configured to cover a part of a surface when observed in planer view.

The term "layered" refers to stacking of layers, where two or more layers may be bonded together or may be detachable from each other.

The technique of the present disclosure can be widely applied to various types of nonaqueous secondary batteries including an electrode in which electrode active material layers (positive electrode active material layer and negative electrode active material layer) are formed on a current collector. Hereinbelow, the details are described.

[Positive Electrode for Lithium Ion Secondary Battery]

In a positive electrode for a lithium ion secondary battery of the present disclosure, the positive electrode includes a positive electrode active material layer containing insulating polyolefin particles and an electroconductive material.

Positive Electrode Active Material Layer

The positive electrode active material layer, which is formed on a positive electrode current collector, includes a positive electrode active material, insulating polyolefin particles, and an electroconductive material. A method of forming the positive electrode active material layer is not limited, and the positive electrode active material layer is formed as follows, for example. A positive electrode active material, insulating polyolefin particles, and an electroconductive material, and other optional material such as a binder or a water-soluble polymer, are dry mixed to form a sheet, which is then pressure-bonded to a positive electrode current collector (dry method). Alternatively, a positive electrode active material, insulating polyolefin particles, and an electroconductive material, and other optional material such as a binder or a water-soluble polymer, are dissolved or dispersed in a dispersion solvent to prepare a positive electrode mixture paste, which is then applied to a positive electrode current collector, and dried (wet method).

As the positive electrode current collector, those used commonly in the field of a lithium ion secondary battery may be used. Specific examples thereof include a sheet and a foil, which contain a stainless steel, aluminum, or titanium. Among them, aluminum sheet and aluminum foil are preferable. The thickness of the sheet or foil is not particularly limited, and is, for example, preferably from 1 μm to 500 μm, more preferably from 2 μm to 100 μm, and still more preferably from 5 μm to 50 μm.

The positive electrode active material layer, which is formed on either surface or both surfaces in the thickness direction of the positive electrode current collector, includes the positive electrode active material, the insulating polyolefin particles, and the electroconductive material, and, if necessary, may further contain a binder, a water-soluble polymer, or the like. As the positive electrode active material, those used commonly in the technical field may be used, and examples thereof include a lithium-containing composite metal oxide, an olivine type lithium salt, a chalcogen compound, and manganese dioxide.

The lithium-containing composite metal oxide is a metallic oxide containing lithium and a transition metal, or a metallic oxide in which a part of the transition metal in the metallic oxide is replaced with a different element. Examples of such a different element include Na, Mg, Sc, Y, Mn, Fe, Co, Ni, Cu, Zn, Al, Cr, Pb, Sb, V, and B. Among them, for example, Mn, Al, Co, Ni, and Mg are preferable. The different elements may be used singly, or in combination of two or more kinds thereof.

Among them, a lithium-containing composite metal oxide is preferable as the positive electrode active material. Examples of the lithium-containing composite metal oxide include $Li_xCoO_2$, $Li_xNiO_2$, $Li_xMnO_2$, $Li_xCo_yNi_{1-y}O_2$, $Li_xCo_yM^1_{1-y}O_z$ (here, $M^1$ represents at least one element selected from the group consisting of Na, Mg, Sc, Y, Mn, Fe, Co, Ni, Cu, Zn, Al, Cr, Pb, Sb, V, and B), $Li_xNi_{1-y}M^2_yO_z$ (here, $M^2$ represents at least one element selected from the group consisting of Na, Mg, Sc, Y, Mn, Fe, Co, Ni, Cu, Zn, Al, Cr, Pb, Sb, V, and B), $Li_xMn_2O_4$, and $Li_xMn_{2-y}M^3_yO_4$ (here, M represents at least one element selected from the group consisting of Na, Mg, Sc, Y, Mn, Fe, Co, Ni, Cu, Zn, Al, Cr, Pb, Sb, V, and B). In the above formulas, x is from 0 to 1.2, y is from 0 to 0.9, and z is from 2.0 to 2.3. The value of x representing the molar ratio of lithium increases or decreases by charging and discharging.

Examples of the olivine type lithium salt include $LiFePO_4$.

Examples of the chalcogen compound include titanium disulfide and molybdenum disulfide.

The positive electrode active materials may be used singly, or in combination of two or more kinds thereof.

The positive electrode active material contains preferably a lithium manganese oxide expressed by $Li_xMn_2O_4$ or $Li_xMn_{2-y}M^3_yO_4$ from a viewpoint of safety. In a case in which the lithium manganese oxide is used for the positive electrode active material, the content of the lithium manganese oxide is preferably 30 mass % or more, and more preferably 40 mass % or more, with respect to a total amount of the positive electrode active material.

Examples of the insulating polyolefin particles in the present disclosure include particles made of polyethylene, polypropylene, polymethylpentene, or polybutene, or a modified product thereof. Among them, the insulating polyolefin particles are preferably particles made of polyethylene or a modified product of polyethylene, or particles made of polypropylene or a modified product of polypropylene. The insulating polyolefin particles may be used singly, or in combination of two or more kinds thereof.

The melting point (Tm) of the insulating polyolefin particles is not particularly limited. From the viewpoint of improving the handling property and safety of the lithium ion secondary battery, the melting point (Tm) of the polyolefin particles is preferably from 70° C. to 160° C., more preferably from 80° C. to 150° C., and still more preferably from 90° C. to 140° C. As the melting point (Tm) of the polyolefin particles is lower, a PTC function is exhibited at a lower temperature, so that the safety can be improved. As the melting point (Tm) of the polyolefin particles is higher, erroneous operation during normal use can be suppressed, and the drying temperature of the electrode can be set high, which can provide an improvement in productivity. The melting point (Tm) of the polyolefin particles can be calculated from an endothermic peak temperature after measuring the specific heat capacity of the polyolefin particles in an inert gas as a temperature function using a differential scanning calorimeter, for example.

From the viewpoint that the positive electrode active material layer can be uniformly formed on the positive electrode current collector and the battery characteristics can be further improved, the average particle diameter of the insulating polyolefin particles is preferably from 0.1 μm to 30 μm, more preferably from 0.5 μm to 15 μm, and still more preferably from 2.5 μm to 10 μm. As the average particle diameter of the polyolefin particles becomes smaller, the positive electrode active material layer tends to be uniformly formed on the positive electrode current collector. As the average particle diameter of the polyolefin particles becomes larger, the battery characteristics tend to be improved. The average particle diameter of the polyolefin particles can be determined, for example, by calculating an arithmetic mean of the long side lengths of all the polyolefin particles in a transmission electron micrograph image at a central portion of the positive electrode current collector in which the positive electrode active material layer containing the polyolefin particles is formed to have a thickness of about 70 μm, in a size of 50 μm-long×50 μm-wide.

From the viewpoint of achieving both the battery characteristics and the PTC function, the content of the polyolefin particles in the case of using the insulating polyolefin particles in the positive electrode active material layer is preferably from 0.1% by mass to 10% by mass, more preferably from 0.5% by mass to 8% by mass, and still more preferably from 2.5% by mass to 6.5% by mass, with respect to a total amount of the positive electrode active material layer. As the proportion of the polyolefin particles becomes larger, the positive electrode active material layer tends to have an excellent PTC function. As the proportion of the polyolefin particles becomes smaller, the positive electrode active material layer tends to have excellent battery characteristics.

The form of addition of the insulating polyolefin particles is not particularly limited as long as the polyolefin is maintained in a particle state, and the insulating polyolefin particles can be applied in a powder dry form, in a state where the insulating polyolefin particles are dispersed in a solvent, or the like. From the viewpoint that moisture is not mixed into the positive electrode mixture paste, the insulating polyolefin particles are preferably used in a powder dry state. From the viewpoint of sufficiently dispersing the polyolefin particles in the positive electrode mixture paste, the polyolefin particles are preferably used in a state where the polyolefin particles are dispersed in a solvent. The solvent for dispersing the polyolefin particles is not particularly limited, and examples thereof include N-methyl-2-pyrrolidone (NMP), tetrahydrofuran, and dimethylformamide.

Examples of the electroconductive material used for the positive electrode active material layer include carbon black, graphite, a carbon fiber, and a metal fiber. Examples of the carbon black include acetylene black, Ketjen black, channel black, furnace black, lamp black, and thermal black. Examples of the graphite include natural graphite and artificial graphite. The electroconductive materials may be used singly, or in combination of two or more kinds thereof.

From the viewpoint of achieving both the battery characteristics and the PTC function, the content of the electroconductive material in the case of using the electroconductive material for the positive electrode active material layer is such that the mass ratio of the insulating polyolefin particles to the electroconductive material in the positive electrode active material layer (insulating polyolefin particles/electroconductive material) is preferably from 0.15/0.85 to 0.85/0.15, more preferably from 0.3/0.7 to 0.7/0.3, and still more preferably from 0.4/0.6 to 0.6/0.4. As the proportion of the electroconductive material becomes larger, the positive electrode active material layer tends to have excellent battery characteristics. As the proportion of the electroconductive material becomes smaller, the positive electrode active material layer tends to have a more excellent PTC function.

Examples of the binder which may be used in the positive electrode active material layer include poly(vinyl acetate), poly(methyl methacrylate), nitrocellulose, a fluororesin, rubber particles, and a resin containing a structural unit derived from a nitrile group-containing monomer. Examples of fluororesin include polytetrafluoroethylene (PTFE), poly(vinylidene fluoride) (PVDF), a tetrafluoroethylene-hexafluoropropylene copolymer (FEP), and a vinylidene fluoride-hexafluoropropylene copolymer. Examples of the rubber particles include styrene-butadiene rubber particles and acrylonitrile rubber particles.

Examples of the resin containing a structural unit derived from a nitrile group-containing monomer include a resin that contains a structural unit derived from a nitrile group-containing monomer such as acrylonitrile or methacrylonitrile. Examples of commercially available products of the resin containing a structural unit derived from a nitrile group-containing monomer include a copolymer (binder, manufactured by Hitachi Chemical Co., Ltd., trade name: LSR7) obtained by adding acrylic acid and a straight chain ether group to a polyacrylonitrile skeleton.

Among them, in consideration of, for example, improvement of oxidation resistance of a positive electrode active material layer, a binder containing fluorine is preferable. The binders may be used singly, or, if necessary, used in combination of two or more kinds thereof.

Examples of the water-soluble polymer that may be used in the positive electrode active material layer include carboxymethylcellulose, a carboxymethylcellulose derivative such as sodium carboxymethylcellulose, poly(vinyl alcohol), poly(vinyl pyrrolidone), a water-soluble alginic acid derivative, gelatin, carrageenan, glucomannan, pectin, curdlan, gellan gum, and a poly(acrylic acid) derivative. Among them, as the water-soluble polymer, a carboxymethylcellulose derivative, poly(vinyl alcohol), poly(vinyl pyrrolidone), and poly(acrylic acid) are preferable, a carboxymethylcellulose derivative, poly(vinyl pyrrolidone), and poly(acrylic acid) are more preferable, and a carboxymethylcellulose derivative is still more preferable.

The term "polymer" means herein that the water-soluble polymer has a number average molecular weight of 1,000 or more.

The number average molecular weight of the water-soluble polymer is, from a viewpoint of the dispersibility of the electrically conductive particles, preferably 10,000 or more, more preferably 200,000 or more, and still more preferably 300,000 or more. The upper limit of the number average molecular weight of a water-soluble polymer is not particularly limited, and from a practical viewpoint, is preferably 1,000,000 or less.

From the same viewpoint as above, the weight-average molecular weight of the water-soluble polymer is preferably 50,000 or more, more preferably 1,000,000 or more, and still more preferably 2,000,000 or more. The upper limit of the weight average molecular weight of a water-soluble polymer is not particularly limited, and from a practical viewpoint, is preferably 5,000,000 or less.

The number average molecular weight and weight average molecular weight of the water-soluble polymer can be calculated, for example, based on a calibration curve that is obtained from a HPLC (High Performance Liquid Chromatography) system provided with a differential refractometer as a detector and connected with a GPC (Gel Permeation Chromatography) column, using a mixture solution of a NaCl aqueous solution and acetonitrile as an eluent and pullulan as a reference substance.

The viscosity (60 rpm) at 25° C. of the water-soluble polymer prepared to a 1% by mass aqueous solution is preferably from 100 mPa·s to 8,000 mPa·s, more preferably from 500 mPa·s to 6,000 mPa·s, and still more preferably from 1,000 mPa·s to 4,000 mPa·s.

The current cutoff temperature of the positive electrode for a lithium ion secondary battery of the present disclosure is preferably set to from 70° C. to 160° C., and more preferably set to from 90° C. to 120° C. In a case in which the current cutoff temperature is set to from 70° C. to 160° C., in an incident of a trouble in a battery itself or various devices mounted with batteries, the current can be cut off so as to suppress heat generation, and also the power supply and the like from the battery to such various devices can be stopped, which provides extremely high safety. In a case in which the current cutoff temperature is set to from 90° C. to 120° C., there are advantages in that malfunction during normal use can be avoided and the current can be securely cut off in an incident of a trouble such as overcharge. The current cutoff temperature as described above depends on the melting point (Tm) of the polyolefin particles. In a case in which the current cutoff temperature is set to from 90° C. to 120° C., polyethylene particles are preferably used as the polyolefin particles.

Here, the current cutoff temperature is a temperature at which a direct current resistance increase rate is 110% or more with respect to the direct current resistance at 25° C. of the battery.

The positive electrode active material layer may be formed, for example, by coating a positive electrode mixture paste on a positive electrode current collector, followed by drying, and, if necessary, by rolling. The positive electrode mixture paste may be prepared by adding the positive electrode active material together with a binder, an electroconductive material, or the like into a dispersing medium, followed by mixing. Examples of the dispersing medium include N-methyl-2-pyrrolidone (NMP), tetrahydrofuran, and dimethyl formamide.

In a case in which the positive electrode active material layer including the above-described positive electrode active material, the insulating polyolefin particles, and the electroconductive material is formed in the lithium ion secondary battery of the present disclosure, the packing density of the positive electrode active material layer is preferably in a range of from 2.2 g/cm$^3$ to 2.8 g/cm$^3$, more preferably in a range of from 2.3 g/cm$^3$ to 2.7 g/cm$^3$, and still more preferably in a range of from 2.4 g/cm$^3$ to 2.6 g/cm$^3$. In a case in which the packing density of the positive electrode active material layer is 2.8 g/cm$^3$ or less, a nonaqueous electrolyte tends to easily infiltrate into the positive electrode active material layer, and the diffusion speed of lithium ions tends to increase during high-current charge and discharge, whereby the cycle performance may be improved. On the other hand, in a case in which the packing density of the positive electrode active material layer is 2.2 g/cm$^3$ or more, the contact between the positive electrode active material and the electroconductive material is fully secured, so as to reduce the electrical resistance, and the discharge rate performance may be improved.

In a case in which the positive electrode is produced by coating the above-described positive electrode mixture paste on the positive electrode current collector in the lithium ion secondary battery of the present disclosure, the coating amount of the positive electrode mixture paste after evaporating a dispersing medium (i.e., positive electrode active material layer) is preferably in a range of from 100 g/m$^2$ to 300 g/m$^2$, more preferably in a range of from 150 g/m$^2$ to 250 g/m$^2$, and still more preferably in a range of from 180 g/m$^2$ to 220 g/m$^2$. In a case in which the coating amount is 100 g/m$^2$ or more, the positive electrode active material layer does not become too thin and a sufficient battery capacity can be obtained. In a case in which the coating amount is 300 g/m$^2$ or less, the positive electrode active material layer does not become too thick, so that unevenness in a reaction in the thickness direction does not appear during high-current charge and discharge, and the cycle performance is improved.

Meanwhile, from the viewpoints of discharge capacity and discharge rate performance, the thickness of the positive electrode active material layer is preferably from 50 μm to 150 μm, more preferably from 60 μm to 120 μm, and still more preferably from 70 μm to 110 μm.

FIG. 1 is a schematic cross-sectional view of a positive electrode for a lithium ion secondary battery according to the present disclosure obtained by the above method. In FIG. 1, a positive electrode 1 for a lithium ion secondary battery is formed on a positive electrode current collector 2 by binding a positive electrode active material 3, insulating polyolefin particles 4, and an electroconductive material 5 using a binder 6. In a case in which the battery is operated at normal temperature, the electroconductive material existing between the positive electrode active material and the positive electrode current collector and between the positive electrode active material and the positive electrode active material serves as a conductive path, which provides electron transfer during charge and discharge. In a case in which the battery has abnormal heat generation, the insulating polyolefin particles are melted to cover the surface of the positive electrode active material and the surface of the electroconductive material, so that the electroconductive paths between the positive electrode active material and the positive electrode current collector and between the positive electrode active material and the positive electrode active material are cut, which hinders the electron transfer during charge and discharge. This suppresses the battery function in a case in which the battery has abnormal heat generation, to improve the safety of the battery.

[Electrode for Lithium Ion Secondary Battery]

In an electrode for a lithium ion secondary battery of the present disclosure, the electrode includes an electrode active material layer, the electrode active material layer including polyolefin particles and a resin containing a structural unit derived from a nitrile group-containing monomer. The electrode for a lithium ion secondary battery of the present disclosure may be a positive electrode including a positive electrode active material layer or a negative electrode including a negative electrode active material layer.

Positive Electrode Active Material Layer

The positive electrode active material layer, which is formed on a positive electrode current collector, contains at least a positive electrode active material. A method of forming the positive electrode active material layer is not limited, and the positive electrode active material layer is formed as follows, for example. A positive electrode active material and other optional material, such as an electroconductive material, a binder, or a water-soluble polymer, are dry mixed to form a sheet, which is then pressure-bonded to a positive electrode current collector (dry method). Alternatively, a positive electrode active material and other optional material, such as an electroconductive material, a binder, or a water-soluble polymer, are dissolved or dispersed in a dispersion solvent to prepare a positive electrode mixture paste, which is then applied to a positive electrode current collector, and dried (wet method).

The positive electrode active material layer preferable includes, in addition to the positive electrode active material, insulating polyolefin particles and a resin containing a structural unit derived from a nitrile group-containing monomer. The details of the insulating polyolefin particles and the resin containing a structural unit derived from a nitrile group-containing monomer are described below.

Examples of the positive electrode active material layer include those similar to the positive electrode active material layer exemplified for the electrode for a lithium ion secondary battery.

The positive electrode active material layer, which is formed on either surface or both surfaces in the thickness direction of the positive electrode current collector, contains the positive electrode active material, and, if necessary, may further contain an electroconductive material, a binder, a water-soluble polymer, or the like.

Examples of the positive electrode active material include those similar to the positive electrode active material exemplified for the electrode for a lithium ion secondary battery. The positive electrode active material contains preferably a lithium manganese oxide expressed by $Li_xMn_2O_4$ or $Li_xMn_{2-y}M^3{}_yO_4$ (here, M represents at least one element selected from the group consisting of Na, Mg, Sc, Y, Mn, Fe, Co, Ni, Cu, Zn, Al, Cr, Pb, Sb, V, and B; x=0 to 1.2, y=0 to 0.9, and z=2.0 to 2.3) from a viewpoint of safety. In a case in which the lithium manganese oxide is used for the positive electrode active material, the content of the lithium manganese oxide is preferably 30 mass % or more, and more preferably 40 mass % or more, with respect to a total amount of the positive electrode active material.

Examples of the electroconductive material that can be used in the positive electrode active material layer include those similar to the conductive material exemplified for the electrode for a lithium ion secondary battery.

Examples of the binder that can be used in the positive electrode active material layer include those similar to the binder exemplified for the electrode for a lithium ion secondary battery. As the binder, a resin containing a structural unit derived from a nitrile group-containing monomer is preferably used.

The positive electrode active material layer may be formed, for example, by coating a positive electrode mixture paste on a positive electrode current collector, followed by drying, and, if necessary, by rolling. The positive electrode mixture paste may be prepared by adding the positive electrode active material together with a binder, an electroconductive material, or the like into a dispersing medium, followed by mixing. Examples of the dispersing medium include N-methyl-2-pyrrolidone (NMP), tetrahydrofuran, and dimethyl formamide.

In a case in which the positive electrode active material layer containing the above-described positive electrode active material, the electroconductive material, and the binder is formed in the lithium ion secondary battery of the present disclosure, the packing density of the positive electrode active material layer is preferably in a range of from 2.2 g/cm$^3$ to 2.8 g/cm$^3$, more preferably in a range of from 2.3 g/cm$^3$ to 2.7 g/cm$^3$, and still more preferably in a range of from 2.4 g/cm$^3$ to 2.6 g/cm$^3$.

In a case in which the positive electrode is produced by coating the above-described positive electrode mixture paste on the positive electrode current collector in the lithium ion secondary battery of the present disclosure, the coating amount of the positive electrode mixture paste after evaporating a dispersing medium (i.e., positive electrode active material layer) is preferably in a range of from 100 g/m$^2$ to 300 g/m$^2$, more preferably in a range of from 150 g/m$^2$ to 250 g/m$^2$, and still more preferably in a range of from 180 g/m$^2$ to 220 g/m$^2$.

Meanwhile, from the viewpoints of discharge capacity and discharge rate performance, the thickness of the positive electrode active material layer is preferably from 50 μm to 150 μm, more preferably from 60 μm to 120 μm, and still more preferably from 70 μm to 110 μm.

Negative Electrode Active Material Layer

The negative electrode active material layer, which is formed on a negative electrode current collector, contains at least a negative electrode active material. A method of forming the negative electrode active material layer is not limited, and the negative electrode active material layer is formed as follows, for example. A negative electrode active material and other optional material, such as an electroconductive material, a binder, or a water-soluble polymer, are dry mixed to form a sheet, which is then pressure-bonded to a negative electrode current collector (dry method). Alternatively, a negative electrode active material and other optional material, such as an electroconductive material, a binder, or a water-soluble polymer, are dissolved or dispersed in a dispersion solvent to prepare a negative electrode mixture paste, which is then applied to a negative electrode current collector, and dried (wet method).

The negative electrode active material layer preferable includes, in addition to the negative electrode active material, insulating polyolefin particles and a resin containing a structural unit derived from a nitrile group-containing monomer. The details of the insulating polyolefin particles and the resin containing a structural unit derived from a nitrile group-containing monomer are described below.

As the negative electrode current collector, those used commonly in the field of a lithium ion secondary battery may be used. Specific examples thereof include a sheet and a foil, which contain a stainless steel, nickel, or copper. The thickness of the sheet and the foil is not particularly limited, and is, for example, preferably from 1 μm to 500 μm, more preferably from 2 μm to 100 μm, and still more preferably from 5 μm to 50 μm.

The negative electrode active material layer, which is formed on either surface or both surfaces in the thickness direction of the negative electrode current collector, contains the positive electrode active material, and, if necessary, may further contain an electroconductive material, a binder, a water-soluble polymer, thickener, or the like.

As the negative electrode active material, a material which is capable of absorbing and releasing a lithium ion and has been used commonly in the field of a lithium ion secondary battery may be used. Examples of the negative electrode active material include metallic lithium, a lithium alloy, an intermetallic compound, a carbon material, an organic compound, an inorganic compound, a metal complex, and an organic polymer compound. The negative electrode active materials may be used singly, or in combination of two or more kinds thereof. Among them, a carbon material is preferable as the negative electrode active material. Examples of the carbon material include: graphite such as natural graphite (e.g., scale-like graphite) or artificial graphite; carbon black such as acetylene black, Ketjenblack, channel black, furnace black, lamp black, or thermal black; amorphous carbon; and a carbon fiber. The volume average particle diameter of the carbon material is preferably from 0.1 μm to 60 μm, and more preferably from 0.5 μm to 30 μm. The BET specific surface area of the carbon material is preferably from 1 m$^2$/g to 10 m$^2$/g. In particular, among the carbon material, graphite in which a distance ($d_{002}$) between carbon hexagonal planes according to wide-angle X-ray diffractometry is from 3.35 Å to 3.40 Å, and a crystallite (Lc) in the c axis direction is 100 Å or more, is preferable from a viewpoint of further improvement of the discharge capacity of a battery.

Among the carbon materials, from the viewpoints of further improvement of cycle performance and safety, amorphous carbon in which a distance ($d_{002}$) between carbon hexagonal planes according to wide-angle X-ray diffractometry is from 3.5 Å to 3.95 Å, is more preferable.

Examples of the electroconductive material that can be used for the negative electrode active material layer include those similar to the electroconductive material exemplified for the positive electrode active material layer.

Examples of the binder that can be used for the negative electrode active material layer include those used commonly in the field of a lithium ion secondary battery. In a case in which graphite is used as the e negative electrode active material, it is preferable to include a styrene butadiene rubber or an acrylic rubber as the binder.

Examples of the water-soluble polymer that can be used for the negative electrode active material layer include those similar to water-soluble polymer exemplified for the positive electrode active material layer.

The negative electrode active material layer may be formed, for example, by coating a negative electrode mixture paste on a surface of a negative electrode collector, followed by drying, and, if necessary, rolling.

The negative electrode mixture paste may be prepared, for example, by adding a negative electrode active material together with, if necessary, an electroconductive material, a binder, a water-soluble polymer, a thickener, or the like into a dispersing medium, followed by mixing. Examples of the dispersing medium that can be used include N-methyl-2-pyrrolidone (NMP) and water.

Polyolefin Particles

As described above, at least one of the positive electrode active material layer or the negative electrode active material layer includes polyolefin particles.

Examples of the polyolefin particles include particles made of polyethylene, polypropylene, polymethylpentene, or polybutene, or a modified product thereof. Among them, the polyolefin particles are preferably particles made of polyethylene or a modified product of polyethylene, or particles made of polypropylene or a modified product of polypropylene. The polyolefin particles may be used singly, or in combination of two or more kinds thereof.

The melting point (Tm) of the polyolefin particles is not particularly limited. From the viewpoint of improving the handling property and safety of the lithium ion secondary battery, the melting point (Tm) of the polyolefin particles is preferably from 70° C. to 160° C., more preferably from 90° C. to 140° C., and still more preferably from 100° C. to 130° C. As the melting point (Tm) of the polyolefin particles is lower, a PTC function is exhibited at a lower temperature, so that the safety can be improved. As the melting point (Tm) of the polyolefin particles is higher, erroneous operation during normal use can be suppressed, and the drying temperature of the electrode can be set high, which can provide an improvement in productivity. The melting point (Tm) of the polyolefin particles can be calculated from an endothermic peak temperature after measuring the specific heat capacity of the polyolefin particles in an inert gas as a temperature function using a differential scanning calorimeter, for example.

From the viewpoint that the electrode active material layer can be uniformly formed on the current collector and the battery characteristics can be further improved, the average particle diameter of the polyolefin particles is preferably from 0.1 μm to 30 μm, more preferably from 0.5 μm to 15 μm, and still more preferably from 2.5 μm to 10 μm. As the average particle diameter of the polyolefin particles becomes smaller, the electrode active material layer tends to be uniformly formed on the current collector. As the average particle diameter of the polyolefin particles becomes larger, the battery characteristics tend to be improved. The average particle diameter of the polyolefin particles can be determined, for example, by calculating an arithmetic mean of the long side lengths of all the polyolefin particles in a transmission electron micrograph image at a central portion of the current collector in which the electrode active material layer containing the polyolefin particles is formed to have a thickness of about 70 μm, in a size of 50 μm-long×50 μm-wide.

From the viewpoint of achieving both the battery characteristics and the PTC function, the content of the polyolefin particles in the case of using the polyolefin particles in the electrode active material layer is preferably from 0.1% by mass to 10% by mass, more preferably from 0.5% by mass to 8% by mass, and still more preferably from 2.5% by mass to 6% by mass, with respect to a total amount of the electrode active material layer. As the proportion of the polyolefin particles becomes larger, the electrode active material layer tends to have an excellent PTC function. As the proportion of the polyolefin particles becomes smaller, the electrode active material layer tends to have excellent battery characteristics.

The form of addition of the polyolefin particles is not particularly limited as long as the polyolefin is maintained in a particle state, and the polyolefin particles can be applied in a powder dry form, in a state where the polyolefin particles are dispersed in a solvent, or the like.

In a case in which the polyolefin particles are added to the positive electrode active material layer, the insulating polyolefin particles are preferably used in a powder dry state. Meanwhile, from the viewpoint of sufficiently dispersing the polyolefin particles in the positive electrode mixture paste, the polyolefin particles are preferably used in a state where the polyolefin particles are dispersed in a solvent. The solvent for dispersing the polyolefin particles is not particularly limited, and examples thereof include N-methyl-2-pyrrolidone (NMP), tetrahydrofuran, and dimethylformamide.

Resin Containing Structural Unit Derived from Nitrile Group-Containing Monomer

At least one of the above-mentioned positive electrode active material layer and negative electrode active material layer contains a resin containing a structural unit derived from a nitrile group-containing monomer in addition to the polyolefin particles. The resin containing a structural unit derived from a nitrile group-containing monomer is preferably soluble or easily soluble in an organic solvent.

Examples of the resin containing a structural unit derived from a nitrile group-containing monomer include a copolymer of (meth)acrylonitrile and a compound having an ethylenically unsaturated bond. From the viewpoint that flexibility and binding property can be further improved, the resin containing a structural unit derived from a nitrile group-containing monomer preferably contains a structural unit derived from a nitrile group-containing monomer, and at least one structural unit selected from the group consisting of a structural unit derived from a monomer represented by the following Formula (I) and a structural unit derived from a monomer represented by the following Formula (II). From the viewpoint that the binding property can be further improved, the resin containing a structural unit derived from a nitrile group-containing monomer preferably contains a structural unit derived from a carboxy group-containing monomer.

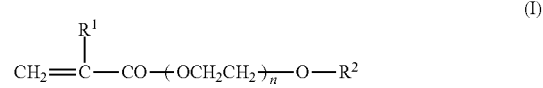

(I)

wherein $R^1$ is a hydrogen atom or a methyl group; $R^2$ is a hydrogen atom or a monovalent hydrocarbon group; and n is an integer of 1 to 50.

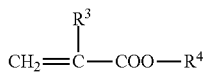

wherein $R^3$ is a hydrogen atom or a methyl group; and $R^4$ is an alkyl group having 4 to 100 carbon atoms.)

<Nitrile Group-Containing Monomer>

The nitrile group-containing monomer is not particularly limited. Examples of the nitrile group-containing monomer include an acrylic nitrile group-containing monomer such as acrylonitrile or methacrylonitrile, a cyanic nitrile group-containing monomer such as α-cyanoacrylate or dicyanovinylidene, and a fumaric nitrile group-containing monomer such as fumaronitrile. Among them, acrylonitrile is preferable from the viewpoint of the plasticity and flexibility of the electrode. These nitrile group-containing monomers may be used singly, or in combination of two or more kinds thereof.

In a case in which acrylonitrile or methacrylonitrile is used as the nitrile group-containing monomer, the content of a structural unit derived from acrylonitrile or methacrylonitrile is preferably from 40% by mass to 98% by mass, more preferably from 50% by mass to 96% by mass, and still more preferably from 60% by mass to 95% by mass with respect to a total amount of the binder.

<Monomer Represented by Formula (I)>

The monomer represented by Formula (I) is not particularly limited.

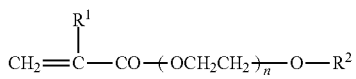

Here, $R^1$ is a hydrogen atom or a methyl group.

n is an integer of 1 to 50, preferably an integer of 2 to 30, and more preferably an integer of 2 to 10.

$R^2$ is a hydrogen atom or a monovalent hydrocarbon group. For example, $R^2$ is preferably a hydrocarbon group having 1 to 50 carbon atoms, more preferably a hydrocarbon group having 1 to 25 carbon atoms, and still more preferably a hydrocarbon group having 1 to 12 carbon atoms. In a case in which the number of the carbon atoms of the hydrocarbon group is 50 or less, sufficient swelling resistance against an electrolytic solution tends to be obtained. Here, for example, the hydrocarbon group is preferably an alkyl group and a phenyl group. $R^2$ is more preferably an alkyl group having 1 to 12 carbon atoms or a phenyl group. The alkyl group may be straight chain or branched chain. In a case in which $R^2$ is an alkyl group or a phenyl group, the hydrogen atom of the alkyl group or phenyl group may be substituted with a halogen atom such as a fluorine atom, a chlorine atom, a bromine atom, or an iodine atom, a nitrogen atom-containing group, a phosphorus atom-containing group, an oxygen atom-containing group, an aromatic group, a cycloalkyl group having 3 to 10 carbon atoms, or the like.

Examples of commercially available products of the monomer represented by Formula (I) include ethoxydiethylene glycol acrylate (trade name: LIGHT-ACRYLATE EC-A, manufactured by Kyoeisha Chemical Co., Ltd.), methoxytriethylene glycol acrylate (trade name: LIGHT-ACRYLATE MTG-A, manufactured by Kyoeisha Chemical Co., Ltd.; trade name: NK ESTER AM-30G manufactured by Shin-Nakamura Chemical Co., Ltd.), methoxypoly(n=9) ethylene glycol acrylate (trade name: LIGHT-ACRYLATE 130-A, manufactured by Kyoeisha Chemical Co., Ltd.; trade name: NK ESTER AM-90G, manufactured by Shin-Nakamura Chemical Co., Ltd.), methoxypoly(n=13)ethylene glycol acrylate (trade name: NK ESTER AM-130G, manufactured by Shin-Nakamura Chemical Co., Ltd.), methoxypoly(n=23)ethylene glycol acrylate (trade name: NK ESTER AM-230G, manufactured by Shin-Nakamura Chemical Co., Ltd.), octoxypoly(n=18)ethylene glycol acrylate (trade name: NK ESTER A-OC-18E, manufactured by Shin-Nakamura Chemical Co., Ltd.), phenoxydiethylene glycol acrylate (trade name: LIGHT-ACRYLATE P-200A, manufactured by Kyoeisha Chemical Co., Ltd.; trade name: NK ESTER AMP-20GY, manufactured by Shin-Nakamura Chemical Co., Ltd.), phenoxypoly(n=6)ethylene glycol acrylate (trade name: NK ESTER AMP-60G manufactured by Shin-Nakamura Chemical Co., Ltd.), nonylphenol EO adduct (n=4) acrylate (trade name: LIGHT-ACRYLATE NP-4EA, manufactured by Kyoeisha Chemical Co., Ltd.), nonylphenol EO adduct (n=8) acrylate (trade name: LIGHT-ACRYLATE NP-8EA, manufactured by Kyoeisha Chemical Co., Ltd.), methoxydiethylene glycol methacrylate (trade name: LIGHT-ESTER MC, manufactured by Kyoeisha Chemical Co., Ltd.; trade name: NK ESTER M-20G, manufactured by Shin-Nakamura Chemical Co., Ltd.), methoxytriethylene glycol methacrylate (trade name: LIGHT-ESTER MTG, manufactured by Kyoeisha Chemical Co., Ltd.), methoxypoly(n=9)ethylene glycol methacrylate (trade name: LIGHT-ESTER 130MA, manufactured by Kyoeisha Chemical Co., Ltd.; trade name: NK ESTER M-90G, manufactured by Shin-Nakamura Chemical Co., Ltd.), methoxypoly(n=23)ethylene glycol methacrylate (trade name: NK ESTER M-230G, manufactured by Shin-Nakamura Chemical Co., Ltd.), and methoxypoly(n=30) ethylene glycol methacrylate (trade name: LIGHT-ESTER 041MA, manufactured by Kyoeisha Chemical Co., Ltd.). Here, "EO" means an ethyleneoxy group, and "n" means the number of structural units of the ethyleneoxy group. Among them, methoxytriethylene glycol acrylate (in Formula (I), $R^1$ is a hydrogen atom; $R^2$ is a methyl group; and n is 3) is preferable from the viewpoint of reactivity and the like during copolymerization with a nitrile group-containing monomer. These monomers represented by Formula (I) may be used singly, or in combination of two or more kinds thereof.

<Monomer Represented by Formula (II)>

The monomer represented by Formula (II) is not particularly limited.

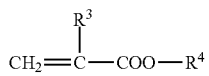

Here, $R^3$ is a hydrogen atom or a methyl group.

$R^4$ is an alkyl group having 4 to 100 carbon atoms, preferably 4 to 50 carbon atoms, more preferably 6 to 30 carbon atoms, and still more preferably 8 to 15 carbon atoms. In a case in which the number of carbon atoms of the alkyl group is 4 or more, the electrode tends to exhibit sufficient flexibility. In a case in which the number of carbon atoms of the alkyl group is 100 or less, sufficient swelling resistance against an electrolytic solution tends to be obtained. The alkyl group constituting $R^4$ may be straight chain or branched chain. The hydrogen atom of the alkyl group constituting $R^4$ may be substituted with a halogen atom such as a fluorine atom, a chlorine atom, a bromine atom, or an iodine atom, a nitrogen atom-containing group, a phosphorus atom-containing group, an oxygen atom-containing group, an aromatic group, a cycloalkyl group having 3 to 10 carbon atoms, or the like. Examples of the alkyl group constituting $R^4$ include a straight-chain or branched-chain saturated alkyl group, and a halogenated alkyl group such as a fluoroalkyl group, a chloroalkyl group, a bromoalkyl group, or an iodinated alkyl group.

In a case in which $R^4$ is a straight-chain or branched-chain saturated alkyl group, examples of the monomer represented by Formula (II) include a long-chain (meth)acrylate ester such as n-butyl(meth)acrylate, isobutyl(meth)acrylate, t-butyl(meth)acrylate, amyl(meth)acrylate, isoamyl(meth)acrylate, hexyl(meth)acrylate, heptyl(meth)acrylate, octyl(meth)acrylate, 2-ethylhexyl(meth)acrylate, nonyl(meth)acrylate, decyl(meth)acrylate, isodecyl(meth)acrylate, lauryl(meth)acrylate, tridecyl(meth)acrylate, hexadecyl(meth)acrylate, stearyl(meth)acrylate, isostearyl(meth)acrylate, cyclohexyl(meth)acrylate, or isobornyl(meth)acrylate. In a case in which $R^4$ is a fluoroalkyl group, examples of the monomer represented by Formula (II) include an acrylate compound such as 1,1-bis(trifluoromethyl)-2,2,2-trifluoroethyl acrylate, 2,2,3,3,4,4,4-heptafluorobutyl acrylate, 2,2,3,4,4,4-hexafluorobutyl acrylate, nonafluoroisobutyl acrylate, 2,2,3,3,4,4,5,5-octafluoropentyl acrylate, 2,2,3,3,4,4,5,5-nonafluoropentyl acrylate, 2,2,3,3,4,4,5,5,6,6,6-undecafluorohexyl acrylate, 2,2,3,3,4,4,5,5,6,6,7,7,8,8,8-pentadecafluorooctyl acrylate, 3,3,4,4,5,5,6,6,7,7,8,8,9,9,10,10,10-heptadecafluorodecyl acrylate, or 2,2,3,3,4,4,5,5,6,6,7,7,8,8,9,9,10,10,10-nonadecafluorodecyl acrylate, and a methacrylate compound such as nonafluoro-t-butyl methacrylate, 2,2,3,3,4,4,4-heptafluorobutyl methacrylate, 2,2,3,3,4,4,5,5-octafluoropentyl methacrylate, 2,2,3,3,4,4,5,5,6,6,7,7-dodecafluoroheptyl methacrylate, heptadecafluorooctyl methacrylate, 2,2,3,3,4,4,5,5,6,6,7,7,8,8,8-pentadecafluorooctyl methacrylate, or 2,2,3,3,4,4,5,5,6,6,7,7,8,8,9,9-hexadecafluorononyl methacrylate. Here, "(meth)acrylate" means acrylate or methacrylate, and "(meth)acrylic acid" means acrylic acid or methacrylic acid. These monomers represented by Formula (II) may be used singly, or in combination of two or more kinds thereof.

In a case in which the monomer represented by Formula (I) or the monomer represented by Formula (II) is used, the content of at least one structural unit selected from the group consisting of the structural unit derived from the monomer represented by Formula (I) and the structural unit derived from Formula (II) is preferably from 1% by mass to 50% by mass, more preferably from 2% by mass to 30% by mass, and still more preferably from 3% by mass to 20% by mass with respect to a total mass of the binder.

<Carboxy Group-Containing Monomer>

A carboxy group-containing monomer is not particularly limited. Examples of the carboxy group-containing monomer include an acrylic carboxy group-containing monomer such as acrylic acid or methacrylic acid, a crotonic carboxy group-containing monomer such as crotonic acid, a maleic carboxy group-containing monomer such as maleic acid or an anhydride thereof, an itaconic carboxy group-containing monomer such as itaconic acid or an anhydride thereof, and a citraconic carboxy group-containing monomer such as citraconic acid or an anhydride thereof. Among them, acrylic acid is preferable from the viewpoint of plasticity and adhesiveness of the electrode. These carboxy group-containing monomers may be used singly, or in combination of two or more kinds thereof.

In a case in which the carboxy group-containing monomer is used, the content of the structural unit derived from the carboxy group-containing monomer is preferably from 0.1% by mass to 20% by mass, more preferably from 1% by mass to 10% by mass, and still more preferably from 2% by mass to 6% by mass with respect to a total mass of the binder.

<Other Monomer>

A resin containing a structural unit derived from a nitrile group-containing monomer can be appropriately used in combination with the structural unit derived from a nitrile group-containing monomer, at least one structural unit selected from the group consisting of the structural unit derived from a monomer represented by Formula (I) and the structural unit derived from a monomer represented by Formula (II), and a structural unit derived from a carboxy group-containing monomer, and further with a structural unit of other monomer different from these monomers. The other monomer is not particularly limited. Examples of the other monomer include a short-chain (meth)acrylate ester such as methyl(meth)acrylate, ethyl(meth)acrylate, or propyl(meth)acrylate; a vinyl halide compound such as vinyl chloride, vinyl bromide, or vinylidene chloride; a styrene compound such as styrene, α-methylstyrene, or sodium styrenesulfonate; an imide compound such as maleimide or N-phenylmaleimide; an amide compound such as (meth)acrylamide; vinyl acetate, sodium (meth)allylsulfonate, sodium (meth)allyloxybenzenesulfonate, or 2-acrylamido-2-methylpropanesulfonate, and a salt thereof. Here, "(meth)acrylamide" means acrylamide or methacrylamide, and "(meth)allyl" means allyl or methallyl. The other monomers may be used singly, or in combination of two or more kinds thereof.

<Content of Structural Unit Derived from Each Monomer>

In a case in which the resin containing a structural unit derived from a nitrile group-containing monomer contains the structural unit derived from a nitrile group-containing monomer, a structural unit derived from a carboxy group-containing monomer, and at least one structural unit selected from the group consisting of a structural unit derived from a monomer represented by Formula (I) and a structural unit derived from a monomer represented by Formula (II), the molar ratio of the structural unit derived from a nitrile group-containing monomer, the structural unit derived from a carboxy group-containing monomer, and at least one structural unit selected from the group consisting of a structural unit derived from a monomer represented by Formula (I) and a structural unit derived from a monomer represented by Formula (II) is such that the content of the structural unit derived from a carboxy group-containing monomer is, for example, preferably from 0.01 to 0.2 mol, more preferably from 0.02 to 0.1 mol, and still more preferably from 0.03 to 0.06 mol with respect to 1 mol of the structural unit derived from a nitrile group-containing monomer, and the total molar ratio of the structural unit derived from a monomer represented by Formula (I) or Formula (II) is preferably from 0.001 to 0.2 mol, more preferably from 0.003 to 0.05 mol, and still more preferably from 0.005 to 0.03 mol. In a case in which the molar ratio of the structural unit derived from a carboxy group-containing monomer is from 0.01 mol to 0.2 mol and the total molar ratio of the structural unit derived from a monomer represented by Formula (I) or Formula (II) is from 0.001 mol to 0.2 mol, excellent adhesion to a current collector, particularly a current collector using a copper foil, and excellent swelling resistance to an electrolytic solution are provided, and the plasticity and flexibility of the electrode tend to be good.

In a case in which the other monomer is used, the content thereof is preferably from 0.005 mol to 0.1 mol, more preferably from 0.01 mol to 0.06 mol, and still more preferably from 0.03 mol to 0.05 mol with respect to 1 mol of the nitrile group-containing monomer.

Here, the content of the structural unit derived from the nitrile group-containing monomer is preferably 50 mol % or more, more preferably 70 mol % or more, and still more preferably 80 mol % or more, with respect to a total amount of the binder.

Current Cutoff Temperature of Electrode for Lithium Ion Secondary Battery

The current cutoff temperature of the electrode for a lithium ion secondary battery of the present disclosure is preferably set to from 70° C. to 160° C., and more preferably set to from 90° C. to 120° C. In a case in which the current cutoff temperature is set to from 70° C. to 160° C., in an incident of a trouble in a battery itself or various devices mounted with batteries, the current can be cut off so as to suppress heat generation, and also the power supply and the like from the battery to such various devices can be stopped, which provides extremely high safety. In a case in which the current cutoff temperature is set to from 90° C. to 120° C., there are advantages in that malfunction during normal use can be avoided and the current can be securely cut off in an incident of a trouble such as overcharge. The current cutoff temperature as described above depends on the melting point (Tm) of the polyolefin particles. In a case in which the current cutoff temperature is set to from 90° C. to 120° C., polyethylene particles are preferably used as the polyolefin particles.

Here, the current cutoff temperature is a temperature at which a direct current resistance increase rate is 110% or more with respect to the direct current resistance at 25° C. of the battery.

<Lithium Ion Secondary Battery>

The lithium ion secondary battery of the present disclosure includes at least one electrode selected from the group consisting of the above-mentioned positive electrode for a lithium ion secondary battery and the above-mentioned electrode for a lithium ion secondary battery. The lithium ion secondary battery of the present disclosure may have the same configuration as a conventional lithium ion secondary battery except the above-mentioned positive electrode for a lithium ion secondary battery and the above-mentioned electrode for a lithium ion secondary battery. For example, the lithium ion secondary battery of this disclosure includes a positive electrode, a negative electrode, an insulation layer, and a nonaqueous electrolyte.

The positive electrode, which is arranged to face the negative electrode via the insulation layer described below, includes a positive electrode current collector and a positive electrode active material layer. The positive electrode may be the above-mentioned electrode for a lithium ion secondary battery, or may be a conventionally known positive electrode.

The negative electrode, which is arranged to face the positive electrode via the insulation layer described below, includes a negative electrode current collector and a negative electrode active material layer. The negative electrode may be the above-mentioned electrode for a lithium ion secondary battery, or may be a conventionally known negative electrode.

Insulation Layer

The insulation layer (hereinafter also referred to as "separator") is provided between the positive electrode and the negative electrode and insulates the positive electrode and the negative electrode. For the insulation layer, those having ion permeability such as an inorganic porous film may be used. As the separator, those used commonly in the field of a lithium ion secondary battery may be used, and examples thereof include a resinous porous sheet. Examples of a resin that constitutes the resinous porous sheet include a polyolefin such as polyethylene or polypropylene, polyamide, polyamide-imide, and polyester. Examples of the resinous porous sheet further includes a nonwoven fabric and a woven fabric. Among them, a porous sheet in which pores having a diameter of from about 0.05 μm to 0.15 μm are formed inside is preferable. Such a porous sheet has high levels of ion permeability, mechanical strength, and insulation property. The thickness of the porous sheet is not particularly limited, and is preferably from 0.5 μm to 30 μm, more preferably from 1 μm to 20 μm.

The inorganic porous film contains mainly an inorganic compound, and has high heat resistance. Examples of the inorganic compound include an inorganic oxide such as alumina or silica, an inorganic nitride such as BN or $Si_3N_4$, and a porous inorganic compound such as zeolite. The inorganic compounds may be used singly, or in combination of two or more kinds thereof. The inorganic porous film may further contain a heat-resistant resin. The heat-resistant resin is not particularly limited, and examples thereof include polyamide and polyimide. Further, the thickness of the inorganic porous film is not particularly limited, and is preferably from 0.5 μm to 30 μm, and more preferably from 1 μm to 20 μm.

Nonaqueous Electrolyte

Examples of the nonaqueous electrolyte include a liquid nonaqueous electrolyte, a gel-form nonaqueous electrolyte, and a solid electrolyte (such as solid polymer electrolyte). The liquid nonaqueous electrolyte contains a solute (supporting electrolyte) and a nonaqueous solvent, and further contains, if necessary, various additives. In general, the solute is soluble in a nonaqueous solvent. The liquid nonaqueous electrolyte is, for example, impregnated into an insulation layer.

As the solute, those used commonly in the field may be used. Examples of the solute include $LiClO_4$, $LiBF_4$, $LiPF_6$, $LiAlCl_4$, $LiSbF_6$, $LiSCN$, $LiCF_3SO_3$, $LiCF_3CO_2$, $LiAsF_6$, $LiB_{10}Cl_{10}$, a lithium lower-aliphatic carboxylate, LiCl, LiBr, LiI, chloroborane lithium ($LiBCl_4$), a borate, and an imide salt. Examples of the borate include lithium bis(1,2-benzenediolate (2-)-O,O')borate, lithium bis(2,3-naphthalenediolate (2-)-O,O')borate, lithium bis(2,2'-biphenyldiolate (2-)-O,O')borate, and lithium bis(5-fluoro-2-olate-1-benzene sulfonic acid-O,O')borate. Examples of an imide salt include bis(trifluoromethane)sulfonimide lithium (($CF_3SO_2)_2NLi$), trifluoromethanesulfonyl (nonafluorobutane)sulfonimide lithium (($CF_3SO_2)(C_4F_9SO_2)NLi$), and bis(pentafluoroethanesulfonyl)imide lithium (($C_2F_5SO_2)_2NLi$). The solutes may be used singly, or, if necessary, used in combination of two or more kinds thereof. The amount of the solute dissolved in a nonaqueous solvent is preferably from 0.5 mol/L to 2 mol/L.

As the nonaqueous solvent, those used commonly in the field may be used. Examples thereof include a cyclic carbonate ester, an open-chain carbonate ester, and a cyclic carboxylic acid ester. Examples of the cyclic carbonate ester include propylene carbonate (PC) and ethylene carbonate (EC). Examples of the open-chain carbonate ester include diethyl carbonate (DEC), ethyl methyl carbonate (EMC), and dimethyl carbonate (DMC). Examples of the cyclic carboxylic acid ester include γ-butyrolactone (GBL) and γ-valerolactone (GVL). The nonaqueous solvents may be used singly, or, if necessary, used in combination of two or more kinds thereof.

It is preferable that the nonaqueous solvent contains vinylene carbonate (VC) from a viewpoint of further improvement of battery characteristics.

When vinylene carbonate (VC) is contained, the content thereof with respect to a total amount of the nonaqueous solvent is preferably from 0.1 mass % to 2 mass %, and more preferably from 0.2 mass % to 1.5 mass %.

Configuration of Lithium Ion Secondary Battery

An embodiment in which the invention is applied to a coin type battery is described.

The coin type battery can be produced, for example, as follows. First, a positive electrode and a negative electrode are cut into a circular shape smaller than a coin outer can. A laminated body in which a positive electrode, an insulating layer, and a negative electrode are layered in this order is produced, and housed in the coin outer can in this state. A nonaqueous electrolyte is injected into the coin outer can, and then the coin outer can is sealed. Thereby, a lithium ion secondary battery can be obtained.

Hereinbelow, an embodiment in which the invention is applied to a laminated battery is described.

A laminated lithium ion secondary battery may be produced, for example, as follows. First, a positive electrode and a negative electrode are cut into rectangular shapes, and tabs are welded to the respective electrodes to produce positive and negative electrode terminals. A laminate body in which a positive electrode, an insulation layer, and a negative electrode are layered in this order is produced, and housed in an aluminum-made laminate package in this state. The positive and negative terminals are derived from the aluminum laminate package, and then the laminate package is sealed. Next, a nonaqueous electrolyte is injected into the aluminum laminate package and then an opening in the aluminum laminate package is sealed, thereby obtaining a lithium ion secondary battery.

Figure 2:
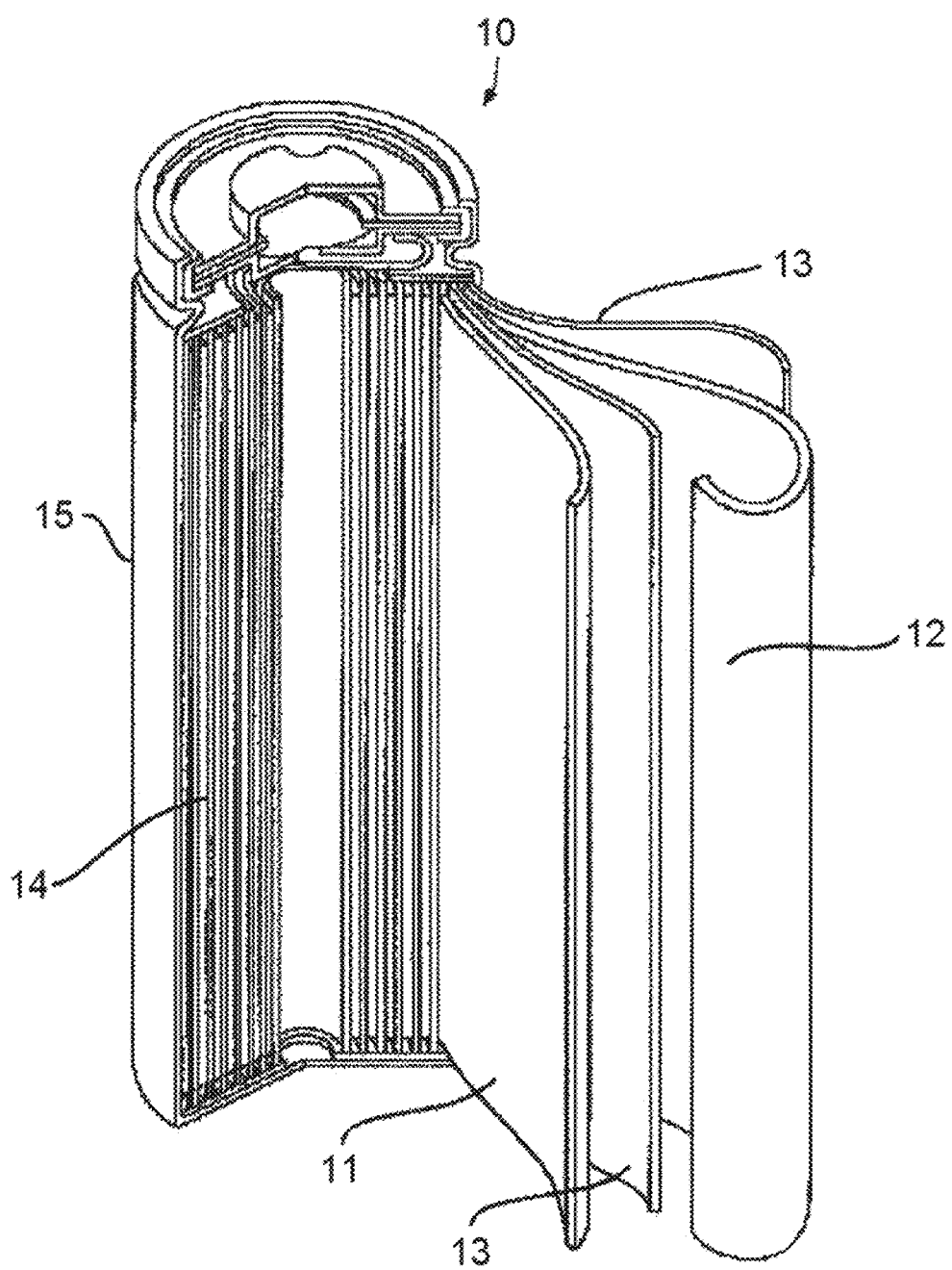
FIG. 2 is a perspective cross-sectional view of a cylindrical lithium ion secondary battery according to an embodiment of the invention.

Next, with reference to FIG. 2, an embodiment in which the invention is applied to a 18650 lithium ion secondary battery is described.

For example, the 18650 type lithium ion secondary battery 10 can be produced as follows. First, a positive electrode and a negative electrode are cut into a strip shape, and tabs are welded to the respective electrodes to produce positive and negative electrode terminals. An electrode group 14 is produced, which is obtained by winding a strip-shaped positive electrode 11 and negative electrode 12 with a separator 13 interposed therebetween so as to have a spiral cross section. In this state, the electrode group 14 is housed in a closed-bottom cylindrical battery container 15 made of nickel plated steel. On the upper end face of the electrode group 14, a ribbon-like positive electrode tab terminal made of aluminum and having one end part fixed to the positive electrode 11 is derived. The other end part of the positive electrode tab terminal is joined to the lower surface of a disc-shaped battery lid which is disposed, by ultrasonic welding, on the upper side of the electrode group 14 and serves as a positive electrode external terminal. On the lower end face of the electrode group 14, a ribbon-like negative electrode tab terminal made of copper and having one end part fixed to the negative electrode 12 is derived. The other end part of the negative electrode tab terminal is joined, by resistance welding, to the inner bottom part of the battery container 15. Therefore, the positive electrode tab terminal and the negative electrode tab terminal are derived to opposite sides on both the end faces of the electrode group 14, respectively. An insulation coating is provided around the entire outer circumference of the electrode group 14. Next, the nonaqueous electrolyte is injected into the battery container 15, and the battery lid is caulked and fixed to the upper part of the battery container 15 with an insulating resin gasket interposed therebetween. For this reason, the inside of the lithium ion secondary battery 10 is hermetically sealed.

In the lithium ion secondary battery of this disclosure, a direct current resistance increase rate is preferably 110% or more, more preferably 130% or more, and still more preferably 140% or more, with respect to the direct current resistance at 25° C. of the battery.

The lithium ion secondary battery of the present disclosure offers high safety as well as high power, and is capable of being applied favorably to the same uses as a conventional nonaqueous electrolyte secondary battery. It can be favorably used especially as a power source for various portable electronic devices such as a cell phone, a notebook computer, a portable information terminal, an electronic dictionary, or a video game console. When the battery is applied to such uses, even when an overcharging condition appears by any chance during battery charging, heat generation can be suppressed, so that heating-up, swelling, or the like of the battery can be prevented securely. Further, a lithium ion secondary battery according to the invention is capable of being also applied to the uses in power storage, a transportation machine such as an electric car or a hybrid car, and the like.

EXAMPLES

Hereinbelow, the invention is described more specifically by way of Examples and Comparative Examples. However, the invention is not limited to these examples.

Example 1

(1) Production of Positive Electrode $LiMn_2O_4$ (positive electrode active material, manufactured by Mitsui Mining and Smelting Co., Ltd.), acetylene black (electroconductive material, trade name: HS-100; average particle diameter: 48 nm, catalog value of Denki Kagaku Kogyo Co., Ltd.; manufactured by Denki Kagaku Kogyo), polyethylene particles (obtained by drying and powdering insulating polyolefin particles, trade name: CHEMIPEARL® W410; average particle diameter: 9.5 µm, catalog value of Mitsui Chemicals, Inc.; melting point: 110° C., catalog value of Mitsui Chemicals, Inc.; manufactured by Mitsui Chemicals, Inc.), and a polyvinylidene fluoride (PVDF) solution (binder, solid content: 12% by mass) were mixed at a solid content mass ratio (positive electrode active material:electroconductive material:insulating polyolefin particles:binder) of 92.0:4.5:2.5:1.0, to obtain a mixture, and the mixture was thoroughly dispersed in N-methyl-2-pyrrolidone (solvent, manufactured by Wako Pure Chemical Industries, special grade), thereby preparing a positive electrode mixture paste. The positive electrode mixture paste was applied to one surface of an aluminum foil (positive electrode current collector, manufactured by Mitsubishi Aluminum KK) having a thickness of 17 µm, dried at 60° C. for 5 hours, and the resultant was then rolled to form a positive electrode active material layer having a thickness of 75 µm, a coating amount of 200 g/m$^2$, and a mixture density of 2.55 g/cm$^3$, thereby producing a positive electrode A. The positive electrode A was heated in a thermostat set at 120° C. for 15 minutes, thereby obtaining a positive electrode B.

Figure 3:
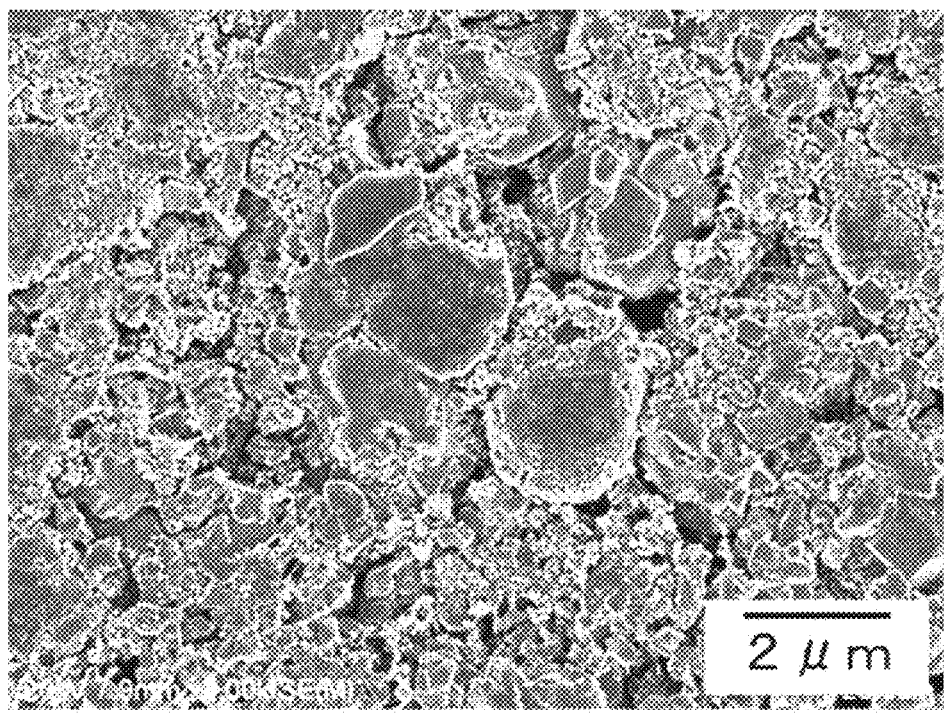
FIG. 3 is a scanning electron micrograph of the surface of a positive electrode active material layer (positive electrode A) obtained in Example 1.

FIG. 3 shows a scanning electron micrograph of the surface of the positive electrode active material layer (positive electrode A) obtained in Example 1.

Figure 4:
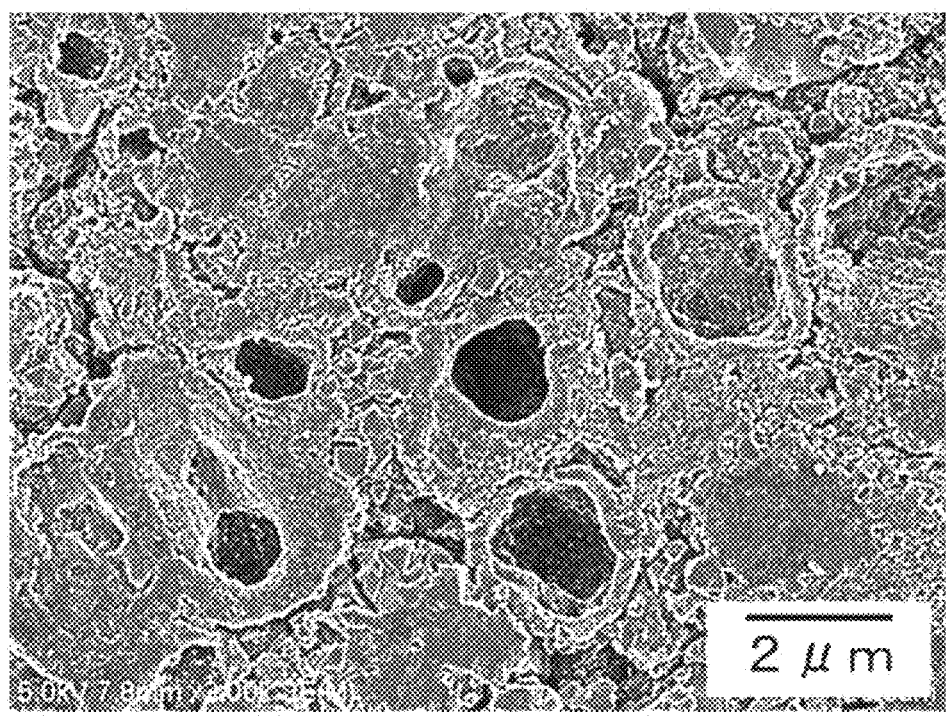
FIG. 4 is a scanning electron micrograph of the surface of a positive electrode active material layer (positive electrode B) obtained in Example 1.

FIG. 4 shows a scanning electron micrograph of the surface of the positive electrode active material layer (positive electrode B) obtained in Example 1.

(2) Production of Negative Electrode

Amorphous carbon (negative electrode active material), acetylene black (electroconductive material, trade name: HS-100; average particle diameter: 48 nm, catalog value of Denki Kagaku Kogyo Co., Ltd.; manufactured by Denki Kagaku Kogyo Co., Ltd.), and a polyvinylidene fluoride (PVDF) solution (binder, solid content: 12% by mass) were mixed at a solid content mass ratio (negative electrode active material:electroconductive material:binder) of 87.6:4.8:7.6, to obtain a mixture, and the mixture was thoroughly dispersed in N-methyl-2-pyrrolidone (solvent, manufactured by Wako Pure Chemical Industries, Ltd., special grade), thereby preparing a negative electrode mixture paste. The negative electrode mixture paste was applied to a copper foil (negative electrode current collector) having a thickness of 10 μm, dried at 100° C. for 30 minutes, and the resultant was rolled to form a negative electrode active material layer having a thickness of 62 μm, a coating amount of 60 g/m$^2$, and a mixture density of 0.97 g/cm$^3$, thereby producing a negative electrode.

(3) Production of Coin Type Battery

Each of the produced positive electrodes A and B was cut into a circular shape so as to have a diameter of 14 mm, thereby obtaining a positive electrode for evaluation. The produced negative electrode was cut into a circular shape so as to have a diameter of 16 mm, thereby obtaining a negative electrode for evaluation. The positive electrode and the negative electrode were layered so that the active material layers were opposed to each other in a state where a separator (trade name: HIPORE, manufactured by Asahi Kasei E-Materials Co., Ltd., cut into a circular shape so as to have a diameter of 19 mm) made of a polyethylene microporous film was interposed therebetween, thereby producing a layered body. The layered body was placed in a coin outer can (manufactured by Toyo System Co., Ltd.), and 1 mL of an electrolytic solution (obtained by adding 0.5 mol % of vinylene carbonate to a 1 M LiPF$_6$-containing ethylene carbonate/dimethyl carbonate mixed solution, volume ratio: 3/7) was added to the coin outer can, followed by hermetically sealing the coin outer can, thereby producing a battery for electrode evaluation.

Example 2

A battery for electrode evaluation was produced in the same manner as in Example 1 except that mixing was performed in a state where the solid content mass ratio of a positive electrode mixture paste (positive electrode active material:electroconductive material:insulating polyolefin particles:binder) was set to 90.0:4.5:4.5:1.0.

Example 3

A battery for electrode evaluation was produced in the same manner as in Example 1 except that mixing was performed in a state where the solid content mass ratio of a positive electrode mixture paste (positive electrode active material:electroconductive material:insulating polyolefin particles:binder) was set to 88.0:4.5:6.5:1.0.

Example 4

A battery for electrode evaluation was produced in the same manner as in Example 1 except that mixing was performed in a state where the solid content mass ratio of a positive electrode mixture paste (positive electrode active material:electroconductive material:insulating polyolefin particles:binder) was set to 84.5:4.5:10.0:1.0.

Example 5

A battery for electrode evaluation was produced in the same manner as in Example 2 except that polyethylene particles (obtained by drying and powdering insulating polyolefin particles, trade name: CHEMIPEARL® W4005; average particle diameter: 0.6 μm, catalog value of Mitsui Chemicals, Inc.; melting point: 110° C., catalog value of Mitsui Chemicals, Inc.) were used as the insulating polyolefin particles, in place of the polyethylene particles (obtained by drying and powdering insulating polyolefin particles, trade name: CHEMIPEARL® W410, average particle diameter: 9.5 μm, catalog value of Mitsui Chemicals, Inc.; melting point: 110° C., catalog value of Mitsui Chemicals, Inc.).

Example 6

A battery for electrode evaluation was produced in the same manner as in Example 2 except that a copolymer (binder, manufactured by Hitachi Chemical Co., Ltd., trade name: LSR7) obtained by adding acrylic acid and a straight chain ether group to a polyacrylonitrile skeleton was used as a binder in place of the polyvinylidene fluoride solution.

Comparative Example 1

A battery for electrode evaluation was produced in the same manner as in Example 1 except that mixing was performed in a state where the solid content mass ratio of a positive electrode mixture paste (positive electrode active material:electroconductive material:insulating polyolefin particles:binder) was set to 90.0:4.5:0:5.5.

Comparative Example 2

(1) Production of Conductive Polyolefin Particles

Polyethylene particles (obtained by drying and powdering insulating polyolefin particles, trade name: CHEMIPEARL® W410; average particle diameter: 9.5 μm, catalog value of Mitsui Chemicals, Inc.; melting point: 110° C., catalog value of Mitsui Chemicals, Inc.) and acetylene black (electroconductive particles, trade name: HS-100; average particle diameter: 48 nm, catalog value of Denki Kagaku Kogyo Co., Ltd.; manufactured by Denki Kagaku Kogyo Co., Ltd.) were thoroughly kneaded at a mass ratio of 0.5/0.5 in a kneading/extrusion molding evaluation test apparatus (trade name: LABOPLASTO MILL, manufactured by Toyo Seiki Seisaku-sho, Ltd.), and then pulverized to produce electroconductive polyolefin particles.

(2) Production of Positive Electrode

LiMn$_2$O$_4$ (positive electrode active material, manufactured by Mitsui Mining & Smelting Co., Ltd.), electroconductive polyolefin particles, and a polyvinylidene fluoride (PVDF) solution (binder, solid content; 12% by mass) were mixed at a solid content mass ratio (positive electrode active material:electroconductive polyolefin particles:binder) of 90.0:9.0:1.0, to obtain a mixture, and the mixture was thoroughly dispersed in N-methyl-2-pyrrolidone (solvent, manufactured by Wako Pure Chemical Industries, Ltd., special grade), thereby preparing a positive electrode mixture paste. The positive electrode mixture paste was applied to one surface of an aluminum foil (positive electrode current collector, manufactured by Mitsubishi Aluminum KK) having a thickness of 17 μm, dried at 60° C. for 5 hours, and the resultant was then rolled to form a positive electrode active material layer having a thickness of 75 μm, a coating amount of 200 g/m$^2$, and a mixture density of 2.55 g/cm$^3$, thereby producing a positive electrode A. The positive electrode A was heated in a thermostat set at 120° C. for 15 minutes, thereby obtaining a positive electrode B.

(3) Production of Negative Electrode

Amorphous carbon (negative electrode active material), acetylene black (electroconductive material, trade name: HS-100; average particle diameter: 48 nm, catalog value of Denki Kagaku Kogyo Co., Ltd.; manufactured by Denki Kagaku Kogyo Co., Ltd.), and a polyvinylidene fluoride (PVDF) solution (binder, solid content: 12% by mass) were mixed at a solid content mass ratio (negative electrode active material:electroconductive material:binder) of 87.6:4.8:7.6, to obtain a mixture, and the mixture was thoroughly dispersed in N-methyl-2-pyrrolidone (solvent, manufactured by Wako Pure Chemical Industries, Ltd., special grade), thereby preparing a negative electrode mixture paste. The negative electrode mixture paste was applied to a copper foil (negative electrode current collector) having a thickness of 10 μm, dried at 100° C. for 30 minutes, and the resultant was rolled to form a negative electrode active material layer having a thickness of 62 μm, a coating amount of 60 g/m$^2$, and a mixture density of 0.97 g/cm$^3$, thereby producing a negative electrode.

(4) Production of Coin Type Battery

Each of the produced positive electrodes A and B was cut into a circular shape so as to have a diameter of 14 mm, thereby obtaining a positive electrode for evaluation. The produced negative electrode was cut into a circular shape so as to have a diameter of 16 mm, thereby obtaining a negative electrode for evaluation. The positive electrode and the negative electrode were layered so that the active material layers were opposed to each other in a state where a separator (trade name: HIPORE, manufactured by Asahi Kasei E-Materials Co., Ltd., cut into a circular shape so as to have a diameter of 19 mm) made of a polyethylene microporous film was interposed therebetween, thereby producing a layered body. The layered body was placed in a coin outer can (manufactured by Toyo System Co., Ltd.), and 1 mL of an electrolytic solution (obtained by adding 0.5 mol % of vinylene carbonate to a 1M LiPF$_6$-containing ethylene carbonate/dimethyl carbonate mixed solution, volume ratio: 3/7) was added to the coin outer can, followed by hermetically sealing the coin outer can, thereby producing a battery for electrode evaluation.

Evaluation of Characteristics (1) Evaluation of Discharge Characteristics

The battery for electrode evaluation using the positive electrode A in each of Examples 1 to 6 and Comparative Examples 1 and 2 was placed in a thermostatic chamber set at 25° C., and charged and discharged using a charge and discharge tester (manufactured by Toyo System Co., Ltd., trade name: TOSCAT-3200) at 25° C. under the following conditions. Constant current and constant voltage (CCCV) charge was performed at 4.2 V and 0.5 C (charge termination condition: 0.01 C), followed by constant current (CC) discharge to 2.7 V at 0.5 C, to measure a discharge capacity as discharge characteristics.

(2) Evaluation of Discharge Rate Characteristics

The battery for electrode evaluation using the positive electrode A in each of Examples 1 to 6 and Comparative Examples 1 and 2 was placed in a thermostatic chamber set at 25° C., and charged and discharged using a charge and discharge tester (manufactured by Toyo System Co., Ltd., trade name: TOSCAT-3200) at 25° C. under the following conditions. Constant current and constant voltage (CCCV) charge was performed at 4.2 V and 0.5 C (charge termination condition: 0.01 C), followed by constant current (CC) discharge to 2.7 V at 0.5 C, to measure a discharge capacity. Next, constant current and constant voltage (CCCV) charge was performed at 4.2 V and 0.5 C (charge termination condition: 0.01 C), and constant current (CC) discharge was then performed to 2.7 V at 3.0 C, to obtain a value calculated from the following formula as discharge rate characteristics. Here, C, which indicates a discharge current value, means "current value (A)/battery capacity (Ah)".

Discharge Rate Characteristics (%)=(Discharge Capacity at 3C/Discharge Capacity at 0.5C)×100

(3) PTC Function (Resistance Increase Rate)

The battery for electrode evaluation using the positive electrode A in each of Examples 1 to 6 and Comparative Examples 1 and 2 was placed in a thermostatic chamber set at 25° C., and direct current resistance (DCR) at 25° C. was then measured as initial resistance. Next, the battery for electrode evaluation using the positive electrode B in each of Examples 1 to 6 and Comparative Examples 1 and 2 was placed in a thermostatic chamber set at 25° C., and direct current resistance (DCR) at 25° C. was measured as resistance after heating. Based on the initial resistance and the resistance after heating, a resistance increase rate (%) was calculated as an index of a PTC function according to the following formula.

Resistance Increase Rate (%)=(Resistance after Heating/Initial Resistance)×100

Here, the direct current resistance (DCR) was calculated from the following formula.

$$\text{Direct current resistance}(DCR) = \frac{(\Delta V_{1C} - V)(I_{1C} - I) + (\Delta V_{3C} - V)(I_{3C} - I) + (\Delta V_{5C} - V)(I_{5C} - I)}{(I_{1C} - I)^2 + (I_{3C} - I)^2 + (I_{5C} - 1)^2}$$

Wherein, I=(I$_{1\,C}$+I$_{3\,C}$+I$_{5\,C}$)/3, V=(ΔV$_{1\,C}$+ΔV$_{3\,C}$+ΔV$_{5\,C}$)/3; I$_{1\,C}$, I$_{3\,C}$ and I$_{5\,C}$ are respectively corresponding discharge current values at 1 C, 3 C and 5 C; and ΔV$_{1\,C}$, ΔV$_{3\,C}$, and ΔV$_{5\,C}$ are respectively voltage changes after 10 seconds from the initiation of discharge at the corresponding discharge current value.

The evaluation results of Examples 1 to 6 and Comparative Examples 1 and 5 are shown in Table 1. The respective numerals with respect to the respective components in the table represent the mixing ratio of the respective components (by mass ratio). Here, "-" means that the relevant component was not added.

TABLE 1

|  | Example 1 | Example 2 | Example 3 | Example 4 | Example 5 | Example 6 | Comparative Example 1 | Comparative Example 2 |
|---|---|---|---|---|---|---|---|---|
| Positive electrode active material | 92.0 | 90.0 | 88.0 | 84.5 | 90.0 | 90.0 | 90.0 | 90.0 |

TABLE 1-continued

|  | Example 1 | Example 2 | Example 3 | Example 4 | Example 5 | Example 6 | Comparative Example 1 | Comparative Example 2 |
|---|---|---|---|---|---|---|---|---|
| Electroconductive material | 4.5 | 4.5 | 4.5 | 4.5 | 4.5 | 4.5 | 4.5 | — |
| Insulating polyolefin particles, average particle diameter: 9.5 μm | 2.5 | 4.5 | 6.5 | 10.0 | — | 4.5 | — | — |
| Insulating polyolefin particles, average particle diameter: 0.6 μm | — | — | — | — | 4.5 | — | — | — |
| Conductive polyolefin particles | — | — | — | — | — | — | — | 9.0 |
| Binder (PVDF) | 1.0 | 1.0 | 1.0 | 1.0 | 1.0 | — | 5.5 | 1.0 |
| Binder (LSR7) | — | — | — | — | — | 1.0 | — | — |
| Discharge characteristics (0.5 C) [mAh/g] | 92.3 | 91.5 | 90.7 | 89.3 | 91.3 | 91.6 | 86.7 | 89.1 |
| Discharge rate characteristics (3.0 C/0.5 C) [%] | 93.3 | 80.0 | 66.7 | 43.4 | 79.1 | 80.1 | 74.0 | 30.1 |
| PTC function (DCR change rate during heating) [%] | 119 | 140 | 201 | 405 | 139 | 140 | 100 | 121 |

The battery for electrode evaluation of each of Examples 1 to 6 in which the positive electrode active material layer contains the insulating polyolefin particles exhibits a PTC function, whereas the battery for electrode evaluation of Comparative Example 1 in which the positive electrode active material layer contains no insulating polyolefin particle exhibits no PTC function. This suggests that the insulating polyolefin particles have an effect of imparting the PTC function to the battery.

In addition, the PTC function of each of Examples 1 to 4 is improved as the content of the insulating polyolefin particles is increased, which suggests that a safe battery can be obtained as the content of the insulating polyolefin particles is increased.

The temperature of 120° C. at which the PTC function is confirmed is lower than the shutdown temperature (135° C.) of the separator. This suggests that the batteries of Examples 1 to 6 increase the resistance to cut off the current before the separator is shut down during heat generation due to overcharge and the like, thereby allowing the heat generation to be suppressed. This demonstrates that the batteries of Examples 1 to 6 have excellent safety.

Comparative Example 2 is a battery for electrode evaluation using electroconductive polyolefin particles prepared by mixing a polyolefin with an electroconductive material in advance. Although the contents of the polyolefin and the electroconductive material in the positive electrode active material layer of Comparative Example 2 are the same as those of Example 2, the battery for electrode evaluation of Comparative Example 2 has poor rate characteristics. This is because the electroconductive material is present in the polyolefin, which causes deterioration in the effect as the electroconductive material.

Synthesis Example 1

Synthesis of Resin (Resin A) Containing Structural Unit Derived from Nitrile Group-Containing Monomer 1804 g of purified water was introduced into a 3-liter separable flask equipped with a stirrer, a thermometer, a reflux condenser, and a nitrogen inlet tube, and while passing nitrogen through at 200 mL/minute, the temperature was raised to 74° C. with stirring, after which nitrogen injection was stopped. Then, an aqueous solution containing 0.968 g of ammonium persulfate, as polymerization initiator, dissolved in 76 g of purified water was added, followed immediately by the dropwise addition over 2 hours of a mixed solution of 183.8 g of acrylonitrile (nitrile group-containing monomer), 9.7 g (0.039 mol per 1 mol acrylonitrile) of acrylic acid (carboxy group-containing monomer), and 6.5 g (0.0085 mol per 1 mol acrylonitrile) of methoxytriethylene glycol acrylate (monomer represented by Formula (I), manufactured by Shin-Nakamura Chemical Co., Ltd., trade name: NK ESTER AM-30G) while holding the temperature of the system at 74° C.±2° C. An aqueous solution containing 0.25 g of ammonium persulfate dissolved in 21.3 g of purified water was then additionally added to the suspended reaction system, after which the temperature was raised to 84° C. and the reaction was carried out for 2.5 hours while maintaining the temperature of the system at 84° C.±2° C. After subsequently cooling to 40° C. over 1 hour, stirring was stopped and spontaneous cooling was carried out at room temperature (25° C.) overnight, thereby producing a reaction solution in which a resin containing a structural unit derived from a nitrile group-containing monomer had precipitated. This reaction solution was suction-filtered. The recovered wet precipitate was washed three times with 1800 g of purified water, and was then subjected to vacuum drying for 10 hours at 80° C., thereby obtaining a resin A containing a structural unit derived from a nitrile group-containing monomer.

Synthesis Example 2

Synthesis of Resin (Resin B) Containing Structural Unit Derived from Nitrile Group-Containing Monomer A reaction solution was prepared by adding, under a nitrogen atmosphere, 45.0 g of acrylonitrile (nitrile group-containing monomer, manufactured by Wako Pure Chemical Industries, Ltd.), 5.0 g (0.0232 mol per 1 mol acrylonitrile) of lauryl acrylate (Aldrich, monomer represented by Formula (II)), 1.175 mg of potassium persulfate (polymerization initiator, manufactured by Wako Pure Chemical Industries, Ltd.), 135 mg of α-methylstyrene dimer (chain-transfer agent, manufactured by Wako Pure Chemical Industries, Ltd.), and 450 mL of purified water (manufactured by Wako Pure Chemical Industries, Ltd.) into a 1.0-liter separable flask equipped with a stirrer, a thermometer, and a reflux condenser. The reaction solution was vigorously stirred for 3 hours at 60° C. and 3 hours at 80° C. After cooling to room temperature, the reaction solution was suction-filtered and the precipitated resin was filtered off. The filtered-off resin was washed in sequence with 300 mL of purified water (manufactured by Wako Pure Chemical Industries, Ltd.) and 300 mL of acetone (Wako Pure Chemical Industries, Ltd.). The washed resin was dried in a vacuum dryer at 60° C./1 torr (133 Pa) for 24 hours, thereby obtaining a resin B containing a structural unit derived from a nitrile group-containing monomer.

Example 7

(1) Production of Positive Electrode $LiMn_2O_4$ (positive electrode active material, manufactured by Mitsui Mining and Smelting Co., Ltd.), acetylene black (electroconductive material, trade name: HS-100; average particle diameter: 48 nm, catalog value of Denki Kagaku Kogyo Co., Ltd.; manufactured by Denki Kagaku Kogyo), the resin A prepared in Synthesis Example 1, and polyethylene particles (polyolefin particles, obtained by drying and powdering water-dispersed particles, trade name: CHEMIPEARL® W410, manufactured by Mitsui Chemicals, Inc.; average particle diameter: 9.5 µm, catalog value of Mitsui Chemicals, Inc.; melting point: 110° C., catalog value of Mitsui Chemicals, Inc.) were mixed at a solid content mass ratio (positive electrode active material:electroconductive material:resin A:polyolefin particles) of 90.0:4.5:1.0:4.5, to obtain a mixture, and the mixture was thoroughly dispersed in N-methyl-2-pyrrolidone (solvent, manufactured by Wako Pure Chemical Industries, special grade), thereby preparing a positive electrode mixture paste. The positive electrode mixture paste was applied to one surface of an aluminum foil (positive electrode current collector, manufactured by Mitsubishi Aluminum KK) having a thickness of 17 µm, dried at 60° C. for 5 hours, and the resultant was then rolled to form a positive electrode active material layer having a thickness of 75 µm, a coating amount of 200 g/m², and a mixture density of 2.55 g/cm³, thereby producing a positive electrode A. The positive electrode A was heated in a thermostat set at 120° C. for 15 minutes, thereby obtaining a positive electrode B. The positive electrode A was heated in a thermostat set at 160° C. for 15 minutes, thereby obtaining a positive electrode C.

(2) Production of Negative Electrode

Amorphous carbon (negative electrode active material), acetylene black (electroconductive material, trade name: HS-100; average particle diameter: 48 nm, catalog value of Denki Kagaku Kogyo Co., Ltd.; manufactured by Denki Kagaku Kogyo Co., Ltd.), and a polyvinylidene fluoride (PVDF) solution (binder, solid content: 12% by mass) were mixed at a solid content mass ratio (negative electrode active material:electroconductive material:binder) of 87.6:4.8:7.6, to obtain a mixture, and the mixture was thoroughly dispersed in N-methyl-2-pyrrolidone (solvent, manufactured by Wako Pure Chemical Industries, Ltd., special grade), thereby preparing a negative electrode mixture paste. The negative electrode mixture paste was applied to a copper foil (negative electrode current collector) having a thickness of 10 µm, dried at 100° C. for 30 minutes, and the resultant was rolled to form a negative electrode active material layer having a thickness of 62 µm, a coating amount of 60 g/m², and a mixture density of 0.97 g/cm³, thereby producing a negative electrode.

(3) Production of Coin Type Battery

Each of the produced positive electrodes A, B, and C was cut into a circular shape so as to have a diameter of 14 mm, thereby obtaining a positive electrode for evaluation. The produced negative electrode was cut into a circular shape so as to have a diameter of 16 mm, thereby obtaining a negative electrode for evaluation. The positive electrode and the negative electrode were layered so that the active material layers were opposed to each other in a state where a separator (trade name: HIPORE, manufactured by Asahi Kasei E-Materials Co., Ltd., cut into a circular shape so as to have a diameter of 19 mm) made of a polyethylene microporous film was interposed therebetween, thereby producing a layered body. The layered body was placed in a coin outer can (manufactured by Toyo System Co., Ltd.), and 1 mL of an electrolytic solution (obtained by adding 0.5 mol % of vinylene carbonate to a 1 M $LiPF_6$-containing ethylene carbonate/dimethyl carbonate mixed solution, volume ratio: 3/7) was added to the coin outer can, followed by hermetically sealing the coin outer can, thereby producing a battery for electrode evaluation.

Example 8

A battery for electrode evaluation was produced in the same manner as in Example 7 except that mixing was performed in a state where the solid content mass ratio of a positive electrode mixture paste (positive electrode active material:electroconductive material:resin A:polyolefin particles) was set to 91.0:4.5:1.0:3.5.

Example 9

A battery for electrode evaluation was produced in the same manner as in Example 7 except that mixing was performed in a state where the solid content mass ratio of a positive electrode mixture paste (positive electrode active material:electroconductive material:resin A:polyolefin particles) was set to 92.0:4.5:1.0:2.5.

Example 10

A battery for electrode evaluation was produced in the same manner as in Example 1 except that the resin B was used in place of the resin including a structural unit derived from a nitrile group-containing monomer.

Example 11

A battery for electrode evaluation was produced in the same manner as in Example 10 except that mixing was performed in a state where the solid content mass ratio of a positive electrode mixture paste (positive electrode active material:electroconductive material:resin B:polyolefin particles) was set to 91.0:4.5:1.0:3.5.

Example 12

A battery for electrode evaluation was produced in the same manner as in Example 10 except that mixing was performed in a state where the solid content mass ratio of a positive electrode mixture paste (positive electrode active material:electroconductive material:resin B:polyolefin particles) was set to 92.0:4.5:1.0:2.5.

Example 13

A battery for electrode evaluation was produced in the same manner as in Example 7 except that polyethylene particles having an average particle diameter of 0.6 µm (polyolefin particles, obtained by drying and powdering water-dispersed particles, trade name: CHEMIPEARL® W4005; average particle diameter: 0.6 µm, catalog value of Mitsui Chemicals, Inc.) were used as the polyolefin particles, in place of the polyethylene particles having an average particle diameter of 9.5 µm (polyolefin particles, obtained by drying and powdering water-dispersed particles, trade name: CHEMIPEARL® W410, average particle diameter: 9.5 µm, catalog value of Mitsui Chemicals, Inc.).

Example 14

A battery for electrode evaluation was produced in the same manner as in Example 7 except that polypropylene particles (polyolefin particles, obtained by drying and powdering water-dispersed particles, trade name: CHEMIPEARL® WP100; average particle diameter: 1.0 µm, catalog value of Mitsui Chemicals, Inc.; melting point: 148° C., catalog value of Mitsui Chemicals, Inc.) were used as the polyolefin particles, in place of the polyethylene particles (polyolefin particles, obtained by drying and powdering water-dispersed particles, trade name: CHEMIPEARL® W410, average particle diameter: 9.5 µm, catalog value of Mitsui Chemicals, Inc.).

Comparative Example 3

A battery for electrode evaluation was produced in the same manner as in Example 7 except that mixing was performed in a state where the solid content mass ratio of a positive electrode mixture paste (positive electrode active material:electroconductive material:resin A:polyolefin particles) was set to 90.0:4.5:5.5:0.

Comparative Example 4

A battery for electrode evaluation was produced in the same manner as in Example 10 except that mixing was performed in a state where the solid content mass ratio of a positive electrode mixture paste (positive electrode active material:electroconductive material:resin B:polyolefin particles) was set to 90.0:4.5:5.5:0.

Comparative Example 5

A battery for electrode evaluation was produced in the same manner as in Example 7 except that polyvinylidene fluoride (resin not including a structural unit derived from a nitrile group-containing monomer) was used as the binder, in place of the resin A.

Evaluation of Adhesion Strength of Positive Electrode Active Material Layer

The positive electrode A produced in each of Examples 7 to 14 and Comparative Examples 3 to 5 was cut into 10 mm×50 mm to prepare a specimen, on which a 180° peel strength was measured using a high precision universal testing machine (trade name: AGS-X, Shimadzu Corporation) at a peel rate of 100 mm/min, a measurement length of 25 mm, and a room temperature of 25° C. The obtained value was defined as the adhesion strength of the positive electrode active material layer.

(2) Evaluation of Discharge Rate Characteristics

The battery for electrode evaluation using the positive electrode A in each of Examples 7 to 14 and Comparative Examples 3 to 5 was placed in a thermostatic chamber set at 25° C., and charged and discharged using a charge and discharge tester (manufactured by Toyo System Co., Ltd., trade name: TOSCAT-3200) at 25° C. under the following conditions. Constant current and constant voltage (CCCV) charge was performed at 4.2 V and 0.5 C (charge termination condition: 0.01 C), followed by constant current (CC) discharge to 2.7 V at 0.5 C, to measure a discharge capacity. Next, constant current and constant voltage (CCCV) charge was performed at 4.2 V and 0.5 C (charge termination condition: 0.01 C), and constant current (CC) discharge was then performed to 2.7 V at 3.0 C, to obtain a value calculated from the following formula as discharge rate characteristics.

$$\text{Discharge Rate Characteristics (\%)} = (\text{Discharge Capacity at 3 C/Discharge Capacity at 0.5 C}) \times 100$$

(3) Discharge Rate Characteristics after Heating at 120° C.

With respect to the battery for electrode evaluation using the positive electrode B in each of Examples 7 to 14 and Comparative Examples 3 to 5, discharge rate characteristics after heating at 120° C. were evaluated in the same manner as the method in item (2) above.

(4) Discharge Rate Characteristics after Heating at 160° C.

With respect to the battery for electrode evaluation using the positive electrode C in each of Examples 7 to 14 and Comparative Examples 3 to 5, discharge rate characteristics after heating at 160° C. were evaluated in the same manner as the method in item (2) above.

(5) PTC Function (Resistance Increase Rate) at 120° C.

The battery for electrode evaluation using the positive electrode A in each of Examples 7 to 14 and Comparative Examples 3 to 5 was placed in a thermostatic chamber set at 25° C., and direct current resistance (DCR) at 25° C. was then measured as initial resistance. Next, the battery for electrode evaluation using the positive electrode B in each of Examples 7 to 14 and Comparative Examples 3 to 5 was placed in a thermostatic chamber set at 25° C., and direct current resistance (DCR) at 25° C. was measured as resistance after heating at 120° C. Based on the initial resistance and the resistance after heating, a resistance increase rate (%) was calculated as an index of a PTC function at 120° C. according to the following formula.

$$\text{Resistance Increase Rate (\%)} = (\text{Resistance after Heating at 120° C./Initial Resistance}) \times 100$$

Here, the direct current resistance (DCR) was calculated from the formula described above.

(6) PTC Function (Resistance Increase Rate) at 160° C.

The battery for electrode evaluation using the positive electrode A in each of Examples 7 to 14 and Comparative Examples 3 to 5 was placed in a thermostatic chamber set at 25° C., and direct current resistance (DCR) at 25° C. was then measured as initial resistance. Next, the battery for electrode evaluation using the positive electrode B in each of Examples 7 to 14 and Comparative Examples 3 to 5 was placed in a thermostatic chamber set at 25° C., and direct current resistance (DCR) at 25° C. was measured as resistance after heating at 160° C. Based on the initial resistance and the resistance after heating, a resistance increase rate (%) was calculated as an index of a PTC function at 160° C. according to the following formula.

$$\text{Resistance Increase Rate (\%)} = (\text{Resistance after Heating at 160° C./Initial Resistance}) \times 100$$

Here, the direct current resistance (DCR) was calculated from the formula described above.

(7) Evaluation of Cycle Characteristics (Discharge Capacity Retention Rate after 50 Cycles)

The battery for electrode evaluation using the positive electrode A in each of Examples 7 to 14 and Comparative Examples 3 to 5 was placed in a thermostatic chamber set at 25° C., and the cycle characteristics at 25° C. were measured as cycle characteristics using a charge and discharge tester (manufactured by Toyo System Co., Ltd., trade name: TOSCAT-3200) under the following charging and discharging conditions. Constant current and constant voltage (CCCV) charge was performed at 4.2 V and 1 C (charge termination condition: 0.01 C), followed by constant current (CC) discharge to 2.7 V at 1 C, and a value calculated from the following formula was evaluated as a discharge capacity retention rate after 50 cycles.

Discharge Capacity Retention Rate (%) after 50 Cycles=(Discharge Capacity at 50th Cycle/Discharge Capacity at 1st Cycle)×100

The evaluation results of Examples 7 to 14 and Comparative Examples 3 to 5 are shown in Table 2. The respective numerals with respect to the respective components in the table represent the mixing ratio of the respective components (by mass ratio). Here, "-" means that the relevant component was not added.

TABLE 2

|  | Example 7 | Example 8 | Example 9 | Example 10 | Example 11 | Example 12 |
|---|---|---|---|---|---|---|
| Positive electrode active material | 90.0 | 91.0 | 92.0 | 90.0 | 91.0 | 92.0 |
| Conductive material | 4.5 | 4.5 | 4.5 | 4.5 | 4.5 | 4.5 |
| Polyethylene particles (average particle diameter: 9.5 μm) | 4.5 | 3.5 | 2.5 | 4.5 | 3.5 | 2.5 |
| Polyethylene particles (average particle diameter: 0.6 μm) | — | — | — | — | — | — |
| Polypropylene particles (average particle diameter: 1.0 μm) | — | — | — | — | — | — |
| Resin A | 1.0 | 1.0 | 1.0 | — | — | — |
| Resin B | — | — | — | 1.0 | 1.0 | 1.0 |
| Polyvinylidene fluoride | — | — | — | — | — | — |
| Adhesion strength of positive electrode active material layer [N/m] | 4.5 | 4.7 | 4.8 | 4.4 | 4.6 | 4.7 |
| Discharge rate characteristics [%] | 80.1 | 87.2 | 93.3 | 80.0 | 87.3 | 93.0 |
| Discharge rate characteristics after heating at 120° C. [%] | 35.3 | 61.6 | 86.6 | 35.5 | 61.5 | 86.5 |
| Discharge rate characteristics after heating at 160° C. [%] | 35.1 | 61.5 | 86.6 | 35.3 | 61.6 | 86.6 |
| PTC characteristics at 120° C., resistance increase rate [%] | 140 | 127 | 119 | 139 | 127 | 119 |
| PTC characteristics at 160° C., resistance increase rate [%] | 140 | 127 | 119 | 139 | 127 | 119 |
| Cycle characteristics [%] | 90.0 | 90.2 | 90.3 | 89.9 | 90.2 | 90.3 |

|  | Example 13 | Example 14 | Comparative Example 3 | Comparative Example 4 | Comparative Example 5 |
|---|---|---|---|---|---|
| Positive electrode active material | 90.0 | 90.0 | 90.0 | 90.0 | 90.0 |
| Conductive material | 4.5 | 4.5 | 4.5 | 4.5 | 4.5 |
| Polyethylene particles (average particle diameter: 9.5 μm) | — | — | — | — | 4.5 |
| Polyethylene particles (average particle diameter: 0.6 μm) | 4.5 | — | — | — | — |
| Polypropylene particles (average particle diameter: 1.0 μm) | — | 4.5 | — | — | — |
| Resin A | 1.0 | 1.0 | 5.5 | — | — |
| Resin B | — | — | — | 5.5 | — |
| Polyvinylidene fluoride | — | — | — | — | 1.0 |
| Adhesion strength of positive electrode active material layer [N/m] | 4.5 | 4.5 | 21.5 | 19.4 | 0.2 |
| Discharge rate characteristics [%] | 79.2 | 79.4 | 80.1 | 80.0 | 80.0 |

TABLE 2-continued

| | | | | | |
|---|---|---|---|---|---|
| Discharge rate characteristics after heating at 120° C. [%] | 35.3 | 79.4 | 80.0 | 80.2 | 35.4 |
| Discharge rate characteristics after heating at 160° C. [%] | 35.2 | 35.2 | 80.1 | 80.1 | 35.2 |
| PTC characteristics at 120° C., resistance increase rate [%] | 138 | 100 | 100 | 100 | 140 |
| PTC characteristics at 160° C., resistance increase rate [%] | 138 | 139 | 100 | 100 | 140 |
| Cycle characteristics [%] | 90.0 | 90.0 | 90.1 | 89.9 | 32.1 |

It is found that the PTC function (resistance increase rate) of each of Examples 7 to 14 is improved as the content ratio of the polyolefin particles increases. In Comparative Example 3 and Comparative Example 4 containing no polyolefin particle, the change in the discharge rate characteristics before and after heating and the PTC function (resistance increase rate) are reduced. This suggests that the addition of the polyolefin particles is effective for imparting the PTC function.

The batteries of Examples 7 to 13 have an excellent resistance increase rate at 120° C. The temperature of 120° C. is lower than the shutdown temperature (135° C.) of the separator. This suggests that the batteries of Examples 7 to 13 have excellent safety since the batteries increase the resistance to cut off the current before the separator is shut down during heat generation due to overcharge and the like, to allow the heat generation to be suppressed.

In the battery of Example 14, the resistance does not increase at 120° C., which provides a remarkable resistance increase at 160° C. This suggests that drying of the battery of Example 14 can be performed at 120° C. This suggests that the battery of Example 14 has excellent productivity.

The batteries of Examples 7 to 14 exhibit improved cycle characteristics compared to the cycle characteristics of the battery of Comparative Example 5. This is presumed as follows. The adhesion strength of the positive electrode active material layer of each of Examples 7 to 14 is excellent than that of Comparative Example 5, which can suppress the peeling of the positive electrode active material layer at the cycle.

The above results suggest that the invention is effective for both the battery characteristics and safety of the lithium ion secondary battery.

The disclosures of Japanese Patent Application No. 2015-24611 filed on Feb. 10, 2015, and Japanese Patent Application No. 2015-24878 filed on Feb. 12, 2015, are incorporated herein by reference in their entirety.

All documents, patent applications, and technical standards described in the present specification are incorporated herein by reference to the same extent as if each individual document, patent application, and technical standard were specifically and individually indicated to be incorporated by reference.

The invention claimed is:

1. A positive electrode for a lithium ion secondary battery, the positive electrode comprising a positive electrode active material layer, the positive electrode active material layer including insulating polyolefin particles, an electroconductive material, and a resin including a structural unit derived from a nitrile group-containing monomer and at least one structural unit selected from the group consisting of a structural unit derived from a monomer represented by the following Formula (I) and a structural unit derived from a monomer represented by the following Formula (II):

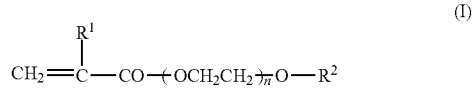

wherein, in Formula (I), $R^1$ is a hydrogen atom or a methyl group; $R^2$ is a hydrogen atom or a monovalent hydrocarbon group; and n is an integer of 1 to 50,

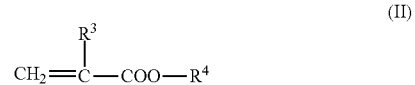

wherein, in Formula (II), $R^3$ is a hydrogen atom or a methyl group; and $R^4$ is an alkyl group having 4 to 100 carbon atoms.

2. The positive electrode for a lithium ion secondary battery according to claim 1, wherein a mass ratio of the insulating polyolefin particles to the electroconductive material in the positive electrode active material layer is from 0.15/0.85 to 0.85/0.15.

3. A lithium ion secondary battery comprising the positive electrode for a lithium ion secondary battery according to claim 1.

4. The positive electrode for a lithium ion secondary battery according to claim 1, wherein a content of the insulating polyolefin particles is from 0.1% by mass to 10% by mass with respect to a total amount of the positive electrode active material layer.

5. The positive electrode for a lithium ion secondary battery according to claim 1, wherein the insulating polyolefin particles have an average particle diameter of from 0.1 μm to 30 μm.

6. The positive electrode for a lithium ion secondary battery according to claim 1, wherein the positive electrode active material layer further comprises a binder, and a content of the at least one structural unit selected from the group consisting of a structural unit derived from a monomer represented by Formula (I) and a structural unit derived from a monomer represented by Formula (II) is from 1% by mass to 50% by mass with respect to a total mass of the binder.

7. An electrode for a lithium ion secondary battery, the electrode comprising an electrode active material layer, the electrode active material layer comprising polyolefin particles and a resin including a structural unit derived from a nitrile group-containing monomer and at least one structural unit selected from the group consisting of a structural unit derived from a monomer represented by the following Formula (I) and a structural unit derived from a monomer represented by the following Formula (II):

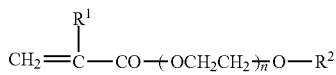
(I)

wherein, in Formula (I), $R^1$ is a hydrogen atom or a methyl group; $R^2$ is a hydrogen atom or a monovalent hydrocarbon group; and n is an integer of 1 to 50

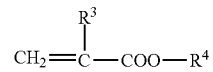
(II)

wherein, in Formula (II). $R^3$ is a hydrogen atom or a methyl group; and $R^4$ is an alkyl group having 4 to 100 carbon atoms.

8. A lithium ion secondary battery comprising the electrode for a lithium ion secondary battery according to claim 7.

9. The electrode for a lithium ion secondary battery according to claim 7, wherein the polyolefin particles have an average particle diameter of from 0.1 μm to 30 μm.

10. The electrode for a lithium ion secondary battery according to claim 7, wherein a content of the polyolefin particles is from 0.1% by mass to 10% by mass with respect to a total amount of the electrode active material layer.

* * * * *